United States Patent [19]
Hamilton

[11] Patent Number: 5,715,381
[45] Date of Patent: Feb. 3, 1998

[54] METHOD OF CREATING AND MANAGING PACKAGES, INCLUDING MULTIPLE DOCUMENTS, IN A PRINTING SYSTEM

[75] Inventor: Robert S. Hamilton, Webster, N.Y.

[73] Assignee: Xerox Corporation, Stamford, Conn.

[21] Appl. No.: 287,315

[22] Filed: Aug. 8, 1994

[51] Int. Cl.$^6$ .................................................. G06K 15/00
[52] U.S. Cl. ............................ 395/114; 395/116; 358/403
[58] Field of Search .......................... 395/114–116, 117, 395/164–166; 358/444, 401, 403

[56] References Cited

U.S. PATENT DOCUMENTS

| | | | |
|---|---|---|---|
| 4,649,513 | 3/1987 | Martin et al. | 364/900 |
| 5,133,048 | 7/1992 | Parsons et al. | 395/114 |
| 5,164,842 | 11/1992 | Gauronski et al. | 358/401 |
| 5,170,340 | 12/1992 | Prokop et al. | 364/143 |
| 5,181,162 | 1/1993 | Smith et al. | 364/419 |
| 5,212,786 | 5/1993 | Sathi | 395/600 |
| 5,243,381 | 9/1993 | Hube | 355/204 |
| 5,398,305 | 3/1995 | Yawata et al. | 395/115 |
| 5,442,732 | 8/1995 | Matysek et al. | 395/116 |
| 5,500,715 | 3/1996 | Ta et al. | 355/204 |
| 5,517,316 | 5/1996 | Hube | 358/401 |
| 5,559,933 | 9/1996 | Boswell | 395/114 |

OTHER PUBLICATIONS

Steven J. Harrington and Robert Buckley, *Interpress II, The Source Book*, Xerox Corporation, 1988, pp. 365–379.

Primary Examiner—Dwayne Bost
Assistant Examiner—Tracy M. Legree
Attorney, Agent, or Firm—Gary B. Cohen

[57] ABSTRACT

A method for managing a plurality of print jobs, including a step of creating, in memory, a package, the package including a first reference and a second reference with a first print job being operatively linked with the package by way of the first reference and a second print job being operatively linked with the package by way of the second reference. The method further includes programming the first print job with a first set of instructions and the second print job with a second set of instructions, the first set of instructions including a finishing instruction. In response to the creating and programming steps, a collated print set of the package is produced. The collated package print set includes a finished print set of the first print job, produced in accordance with the first set of instructions and a print set of the second print job, produced in accordance with the second set of instructions.

30 Claims, 33 Drawing Sheets

METHOD OF CREATING AND MANAGING PACKAGES, INCLUDING MULTIPLE DOCUMENTS, IN A PRINTING SYSTEM

The present invention relates generally to a technique for creating and managing documents in a printing system and, more particularly, to a method for electronically handling "packages", including a plurality of references, which references permit the printing of collated sets of the documents in a given package.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340
Patentees: Prokop et al.
Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. In either case, jobs provided at the IIT are preferably stored in a mass memory, such as the multiple disk arrangement disclosed by the following patent:

U.S. Pat. No. 5,212,786
Patentee: Sathi
Issued: May 18, 1993

In one example, stored jobs are arranged in a job or system file in anticipation of being printed at the IOT. A memory arrangement suitable for such job storage is described in the following patent, the pertinent portions of which are incorporated herein:

U.S. Pat. No. 5,206,735
Patentees: Gauronski et al.
Issued: Apr. 27, 1993

One of the advantageous features of an electronic printing system resides in its ability to compile a plurality of segments, from a variety of sources, into a single document. For instance, in its press release of Sep. 13, 1990 for a printing system referred to as "Lionheart", Kodak indicated that Lionheart provided a "value added printing application" in that final document assembly from multiple sources could be obtained with the system. Indeed, Xerox Corporation, in the following textbook, the pertinent portions of which are incorporated herein by reference, teaches a technique for compiling sequence insert files or masters into a single document:

Harrington, S. J. and Buckley, R. R.
Interpress: The Source Book
Simon & Schuster, Inc.
1988

In particular, as discussed at pp. 371–378 of the above textbook, a plurality of masters, written in the page description language referred to as Interpress, can be electronically bound together by a suitable program.

Another technique, which exploits object oriented design to electronically assemble the components of a document is discussed in the following patent, the pertinent portions of which are incorporated herein:

U.S. Pat. No. 5,181,162
Patentees: Smith et al.
Issued: Jan. 19, 1993

Smith discloses a document management and production system in which documents are represented as collections of logical components or objects, which objects may be combined and physically mapped onto a page-by-page layout. Objects may also contain further data ("attributes") specifying (a) logical or physical relationships to other objects or to the document as a whole, (b) characteristics relating to the appearance of the content, or (c) access restrictions.

The following reference, the pertinent portions of which are incorporated herein, also relates to a method of compiling previously stored segments of a printing system:

U.S. Pat. No. 5,243,381
Patentee: Hube
Issued: Sep. 7, 1993

U.S. Pat. No. 5,243,381 discloses a method which facilitates "demand printing" by use of one or more control sheets. In one example, a control sheet, including machine readable code, such as bar code, can be developed to reference a location at which each segment is stored in an electronic printing machine with a scanner. To form a document of the segments, the control sheets are scanned, in a predetermined order and read by the scanner. In response to the reading, the segments are retrieved from their respective storage locations and printed in the predetermined order.

The concept of electronically storing a plurality of segments in a single folder, and printing those segments from the folder, has been used in both distributed and centralized printing systems. For example, a Xerox® 6085 workstation is adapted to store a plurality of documents in a folder for printing at a suitable network printer. Additionally, a DocuTech printer, manufactured by Xerox Corporation, is capable of printing two segments from a single print file. In operation, the first segment is delivered to a first output area and the second segment is delivered to a second output area so that hand collation is required.

Various observations regarding the above-discussed references is in order. First, U.S. Pat. No. 5,181,162 does not contemplate that the attribute of an object would include an instruction regarding a finishing operation to be performed on the object. Second, the above-mentioned book-making programs, such as the chapter compiling program of the Interpress book, do not contemplate a technique in which each chapter would include finishing instructions that could be modified on a chapter-by-chapter basis. Finally, the DocuTech does not contemplate a system in which the segments are delivered to the same output area in a collated set of segments. It would be desirable to provide a technique in which a plurality of documents would be stored together, as a package, and the documents would be printed and outputted as a collated group of sets where at least one of the sets possesses its own unique set of finishing characteristics.

The present invention employs network capability to achieve various advantageous ends. The following discussion is intended to provide a background for any appropriate network implementation required by the disclosed embodiment below:

Examples of some recent patents relating to network environments of plural remote terminal shared users of networked printers include Xerox Corporation U.S. Pat. Nos. 5,243,518, 5,226,112, 5,170,340 and 5,287,194. Some patents on this subject by others include U.S. Pat. Nos. 5,113,355, 5,113,494 (originally filed Feb. 27, 1987), 5,181, 162, 5,220,674, 5,247,670; 4,953,080 and 4,821,107. Further by way of background, some of the following Xerox Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651, 278 and 4,623,244, and Canon U.S. Pat. No. 4,760,458 and Jap. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology" "... Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer ..."; "Xerox System Integration Standard Printing Protocol XSIS 118404", April 1984; "Xerox Integrated Production Publishers Solutions: ..." Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox® Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox® Corporation "9700 Electronic printing System"; the "VP Local Laser Printing" software application package, which, together with the Xerox® "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox® Corporation "8000" "Xerox Network Services Product Descriptions" further describe other earlier Xerox® Corporation electronic document printing systems. Eastman Kodak "LionHeart™" systems, first announced Sep. 13, 1990, are also noted. Current popular commercial published "systems software" including LAN workstation connections includes Novell® DOS 7.0, "Windows™" NT 3.1, and IBM OS/2 Version 2.1.

In accordance with one aspect of the disclosed invention there is provided a method for managing a plurality of print jobs, associated with a package, wherein each print job includes a set of instructions so that, upon printing the package, each print job is printed in accordance with a preprogrammed set of characteristic printing properties, and at least one of the print jobs is finished in accordance with a finishing instruction, comprising: creating, in memory, a first package, the first package including a first reference and a second reference, a first print job being operatively linked with the first package by way of the first reference and a second print job being operatively linked with the package by way of the second reference; programming the first print job with a first set of instructions and the second print job with a second set of instructions, the first set of instructions including the finishing instruction; and producing a collated print set of the first package, the collated first package print set including a finished print set of the first print job, produced in accordance with the first set of instructions and a print set of the second print job, produced in accordance with the second set of instructions.

In accordance with another aspect of the disclosed invention there is provided a method for managing a plurality of print jobs, associated with a package, wherein each print job includes a set of instructions so that, upon printing the package, each print job is printed in accordance with a preprogrammed set of characteristic printing properties and at least one of the print jobs is finished in accordance with a finishing instruction, comprising: creating, in memory, a first package, the first package including a first reference and a second reference, a first print job being operatively linked with the first package by way of the first reference and a second print job being operatively linked with the package by way of the second reference; programming the first print job with a first set of instructions, having a first instruction, and the second print job with a second set of instructions having a second instruction; automatically substituting a third instruction for both the first instruction and the second instruction; and producing a print set of the first package, the first package print set including a print set of the first print job, produced in accordance with the first set of instructions and a print set of the second print job, produced in accordance with the second set of instructions.

In accordance with yet another aspect of the disclosed invention there is provided a method for managing a plurality of jobs, stored in a first package, with a printing system having a printing machine communicating with both a first memory section and a second memory section, the second memory section being disposed remotely of the printing machine, each job in the package being outputted in accordance with a preprogrammed set of characteristic printing properties, comprising: creating, in the first memory, a first package, the first package including a first reference and a second reference, the first job being operatively linked with the first package by way of the first reference and the second job being operatively linked with the first package by way of the second reference; programming the first job with a first set of instructions and a second job with a second set of instructions; storing the first job in the second memory section; transmitting a copy of the first job, with a copy of the first set of instructions, from the second memory to the printing machine; and in response to said transmitting, producing a package representation of the first package, the package representation including a representation of the first job copy, produced in accordance with the first set of instructions, and a representation of the second job, produced in accordance with the second set of instructions.

These and other aspects of the invention will become apparent from the following description, the description being used to illustrate a preferred embodiment of the invention when read in conjunction with the accompanying drawings.

Figure 1:
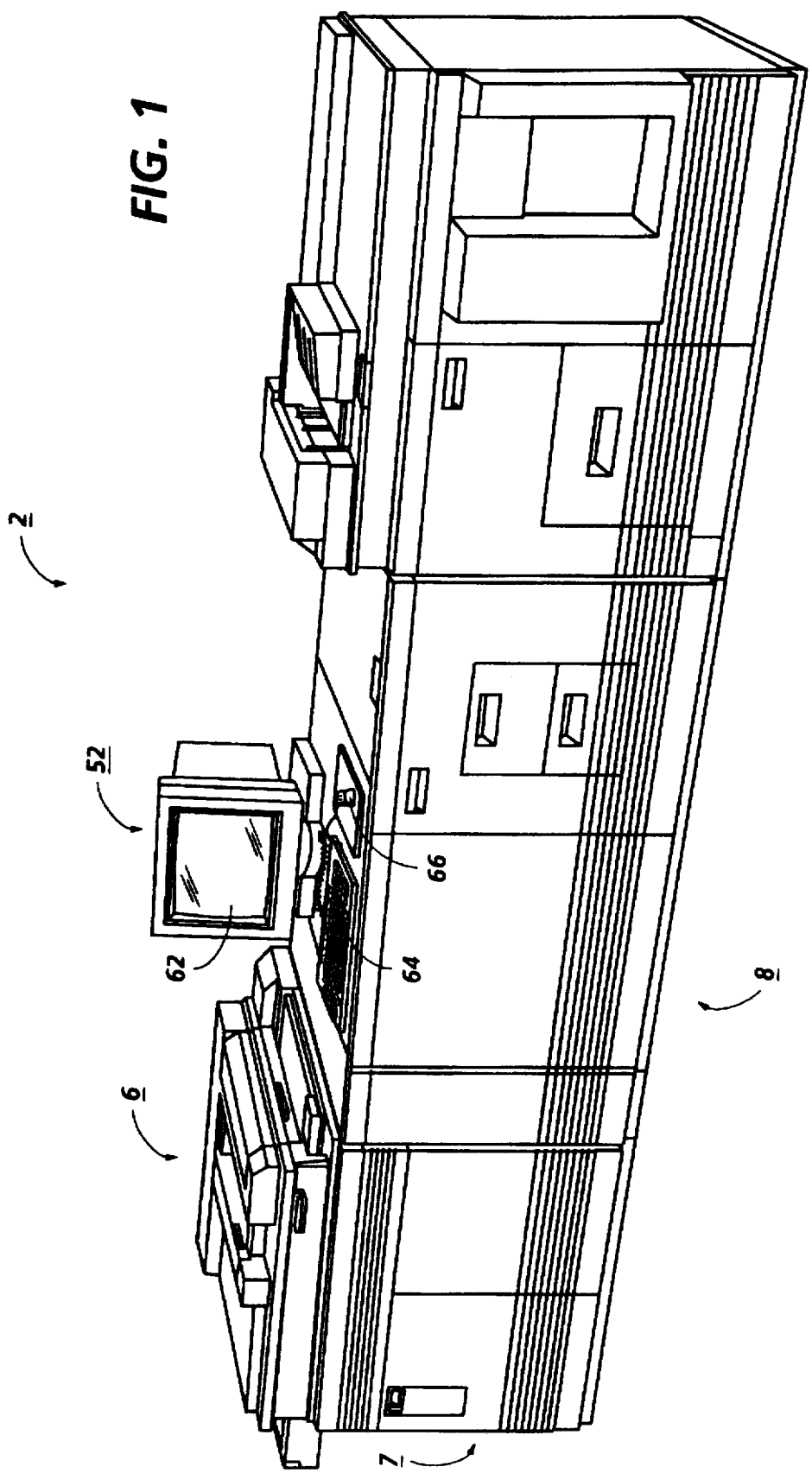
FIG. 1 is a perspective view an electronic printing system incorporating the printing materials cost estimating approach of the present invention.
Figure 2:
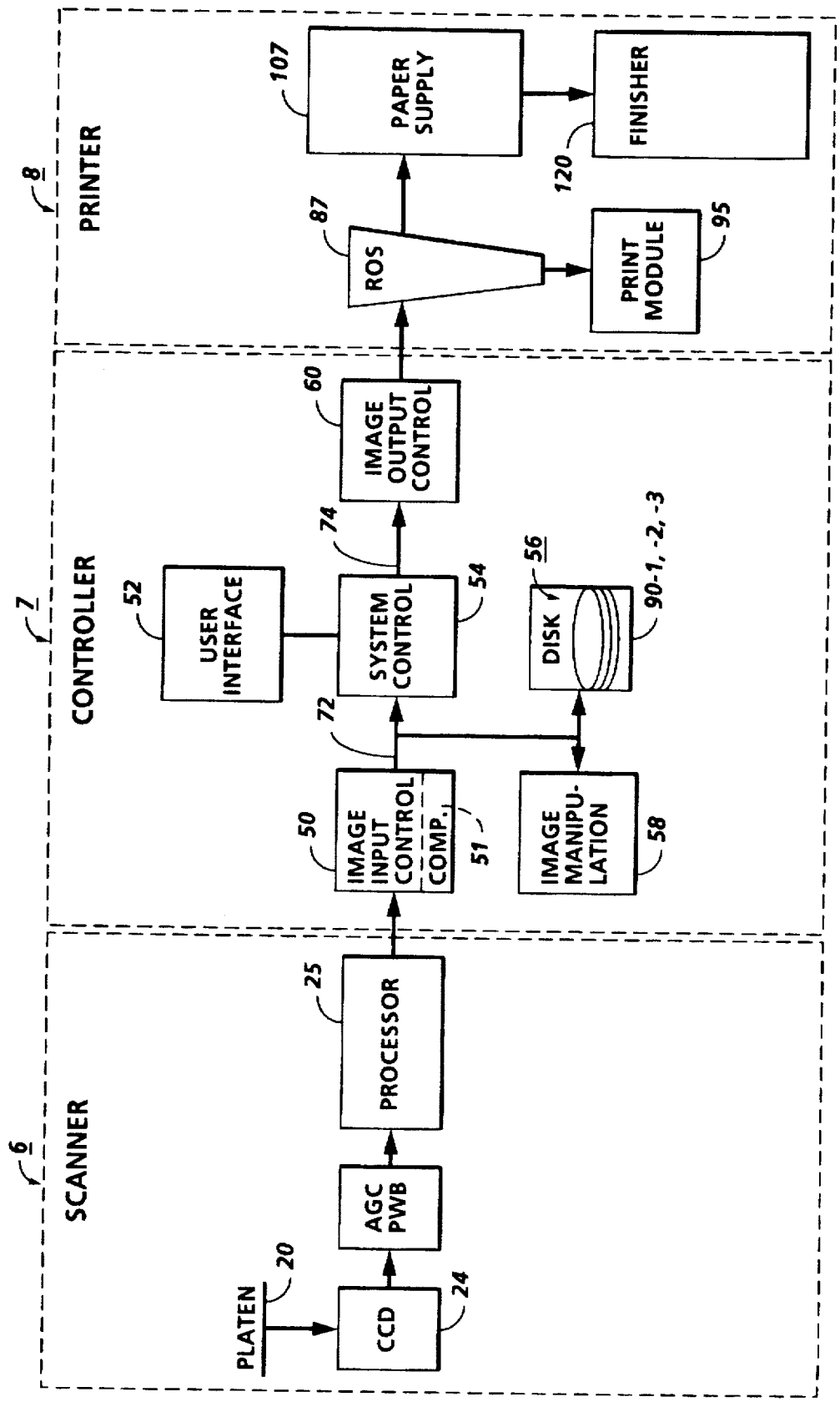
FIG. 2 is a block diagram depicting the major elements of the printing system shown in FIG. 1.
Figure 5:
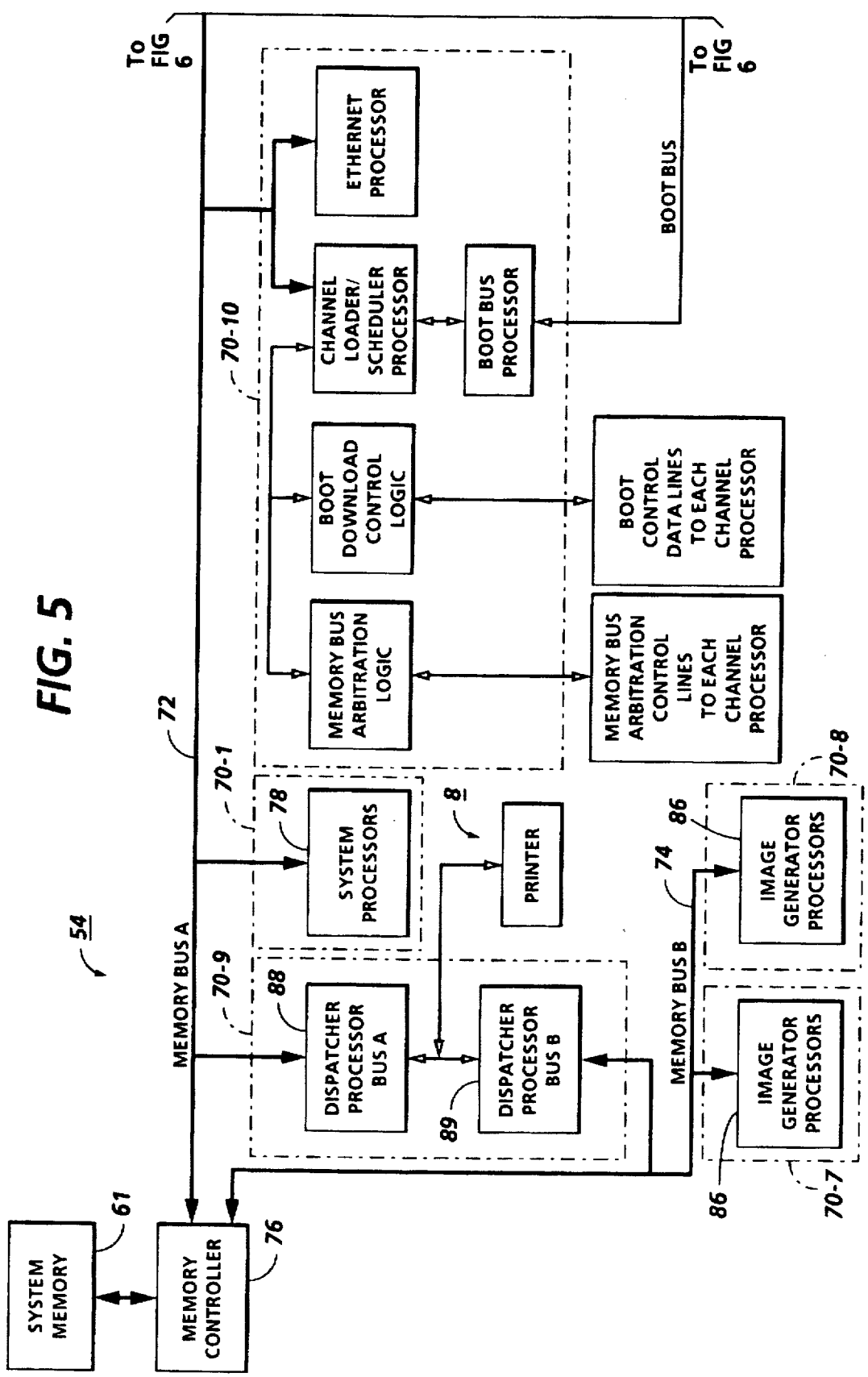
Figure 6:
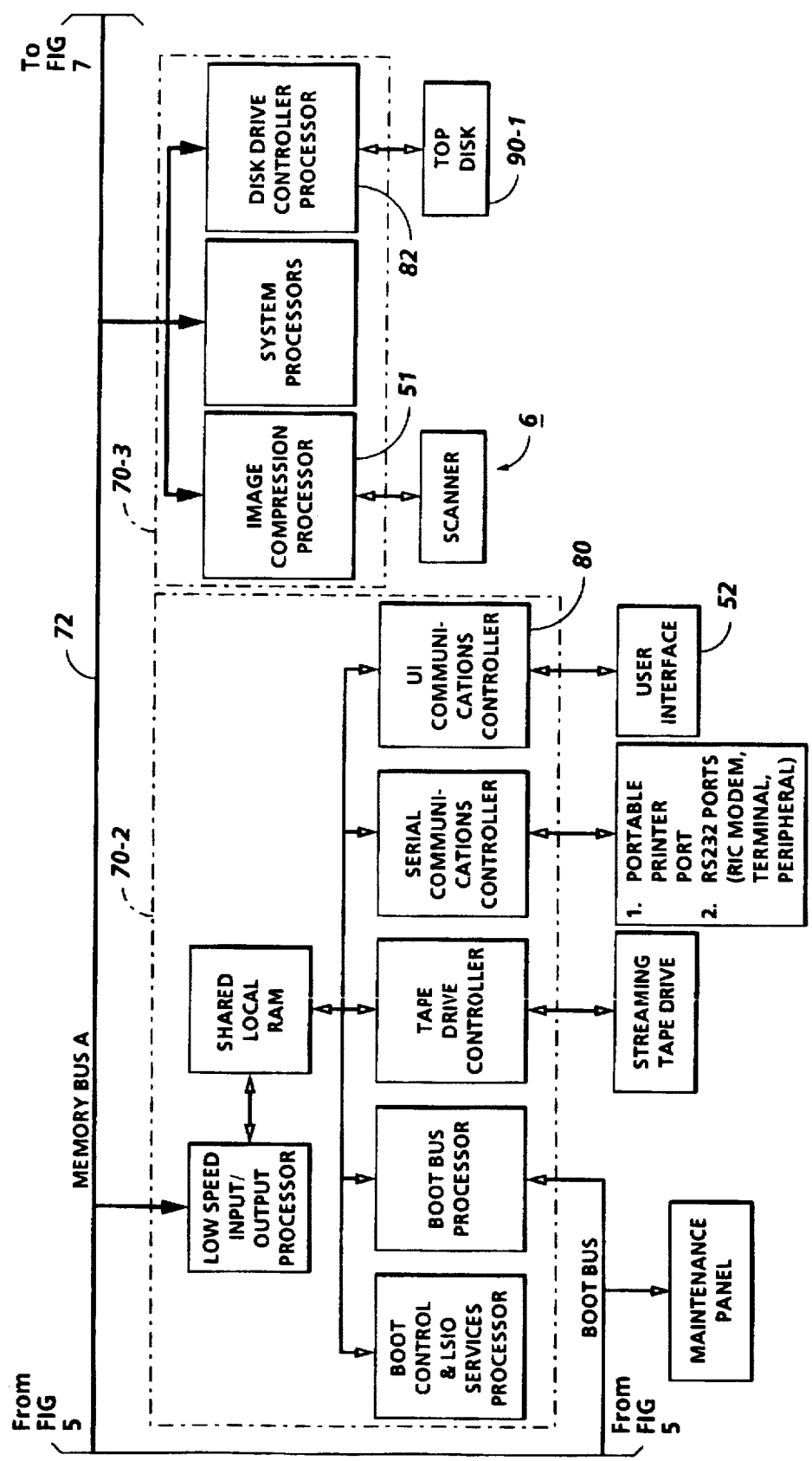
Figure 7:
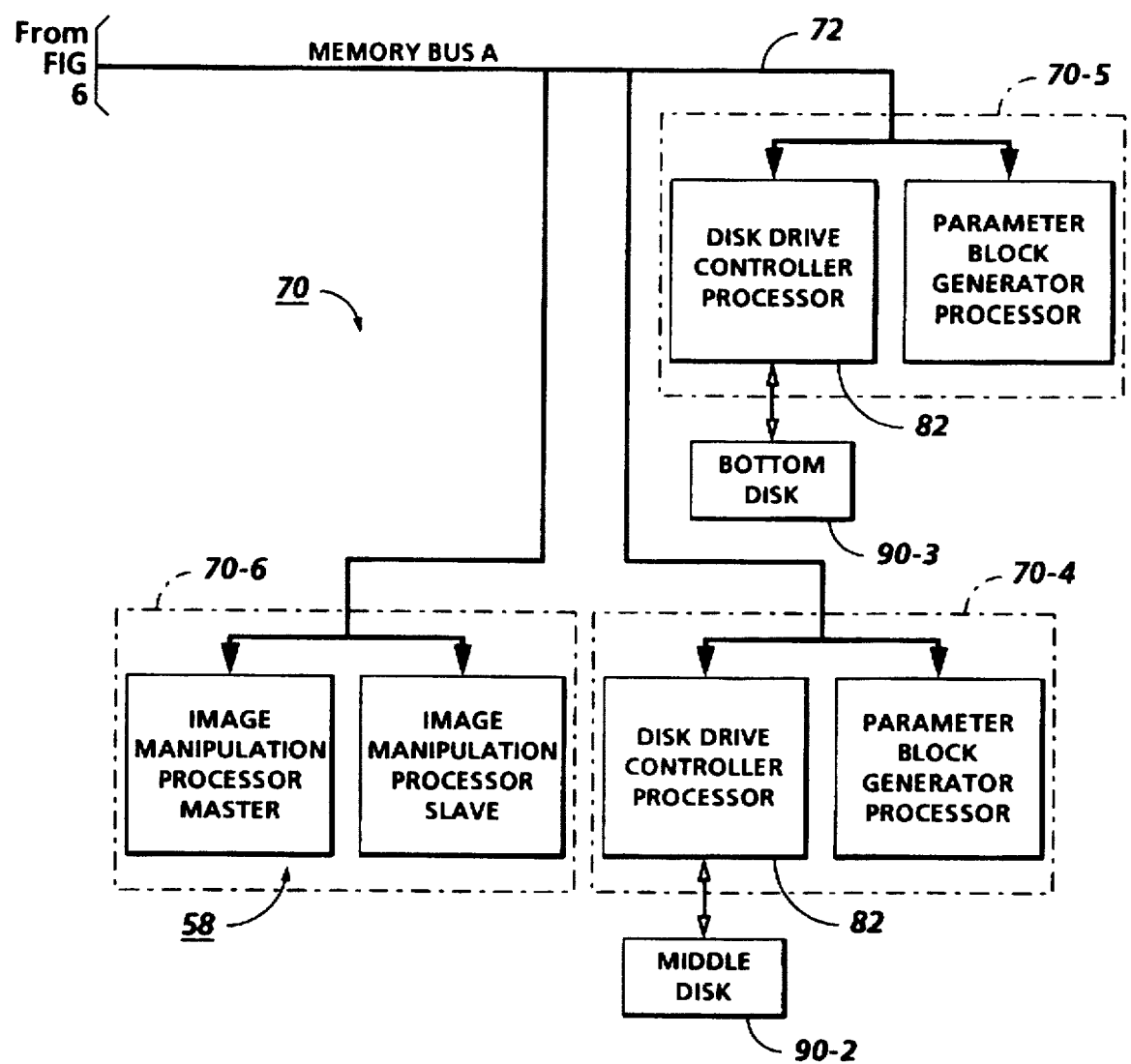
Figure 8:
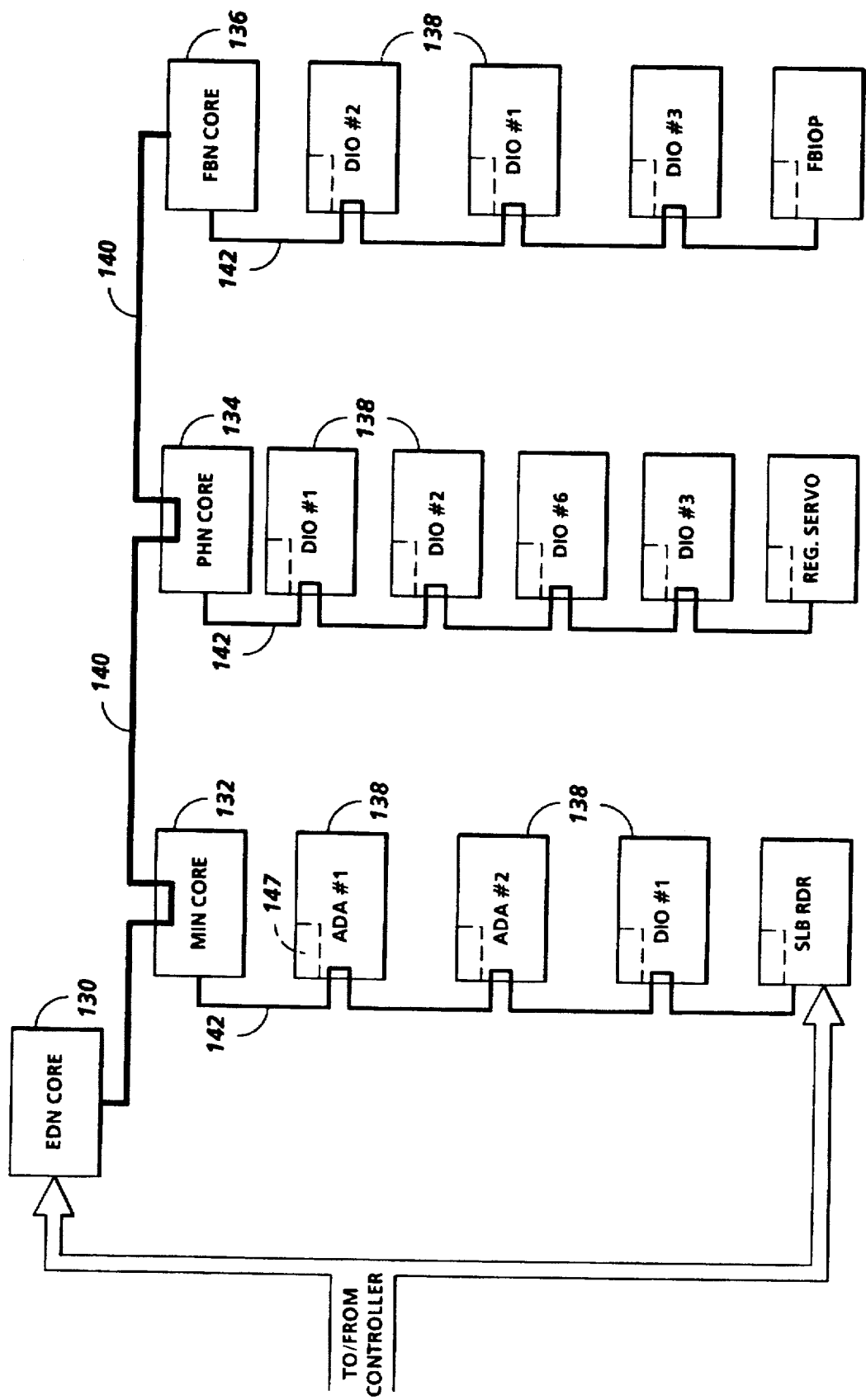
Figure 10:
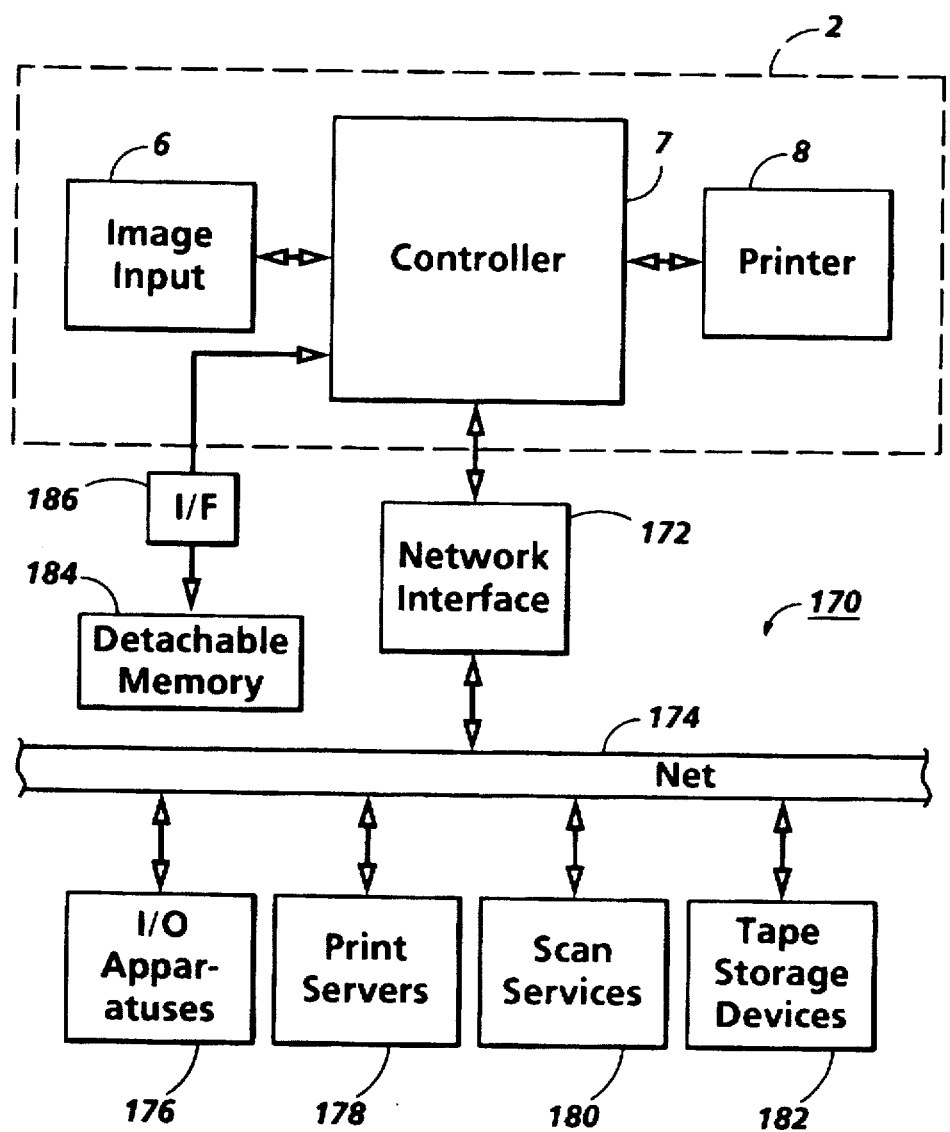
Figure 11:
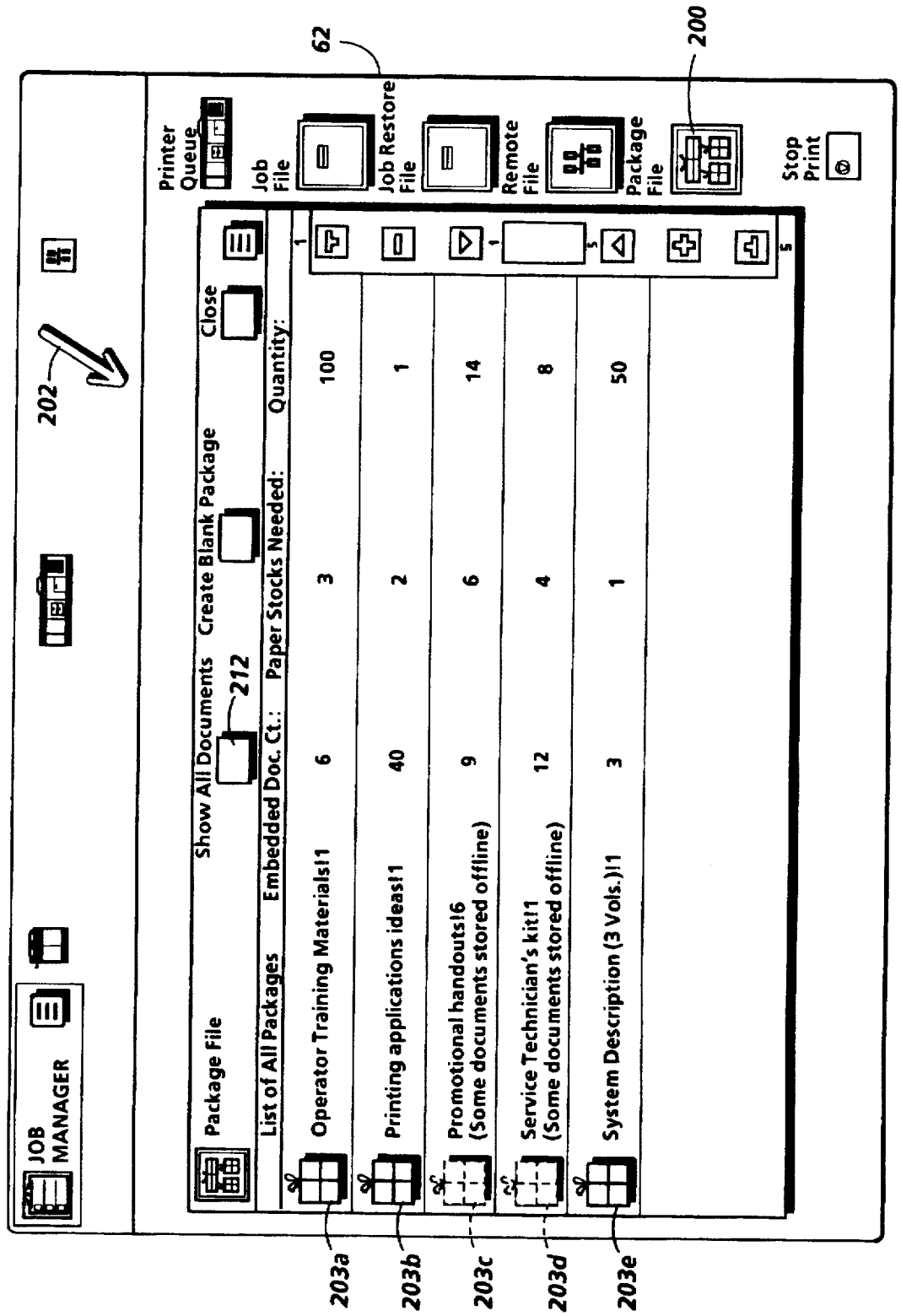
Figure 12:
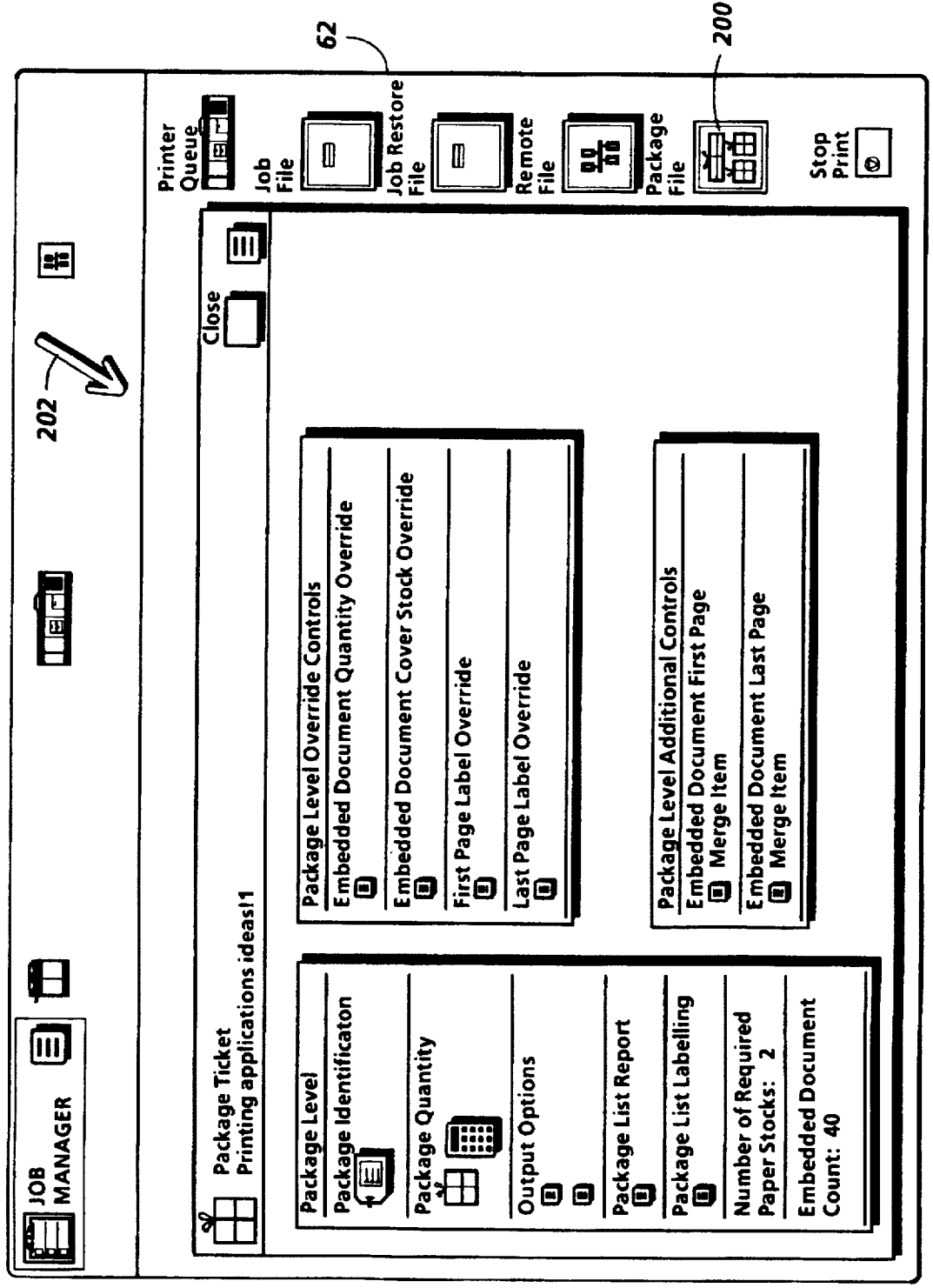
Figure 13:
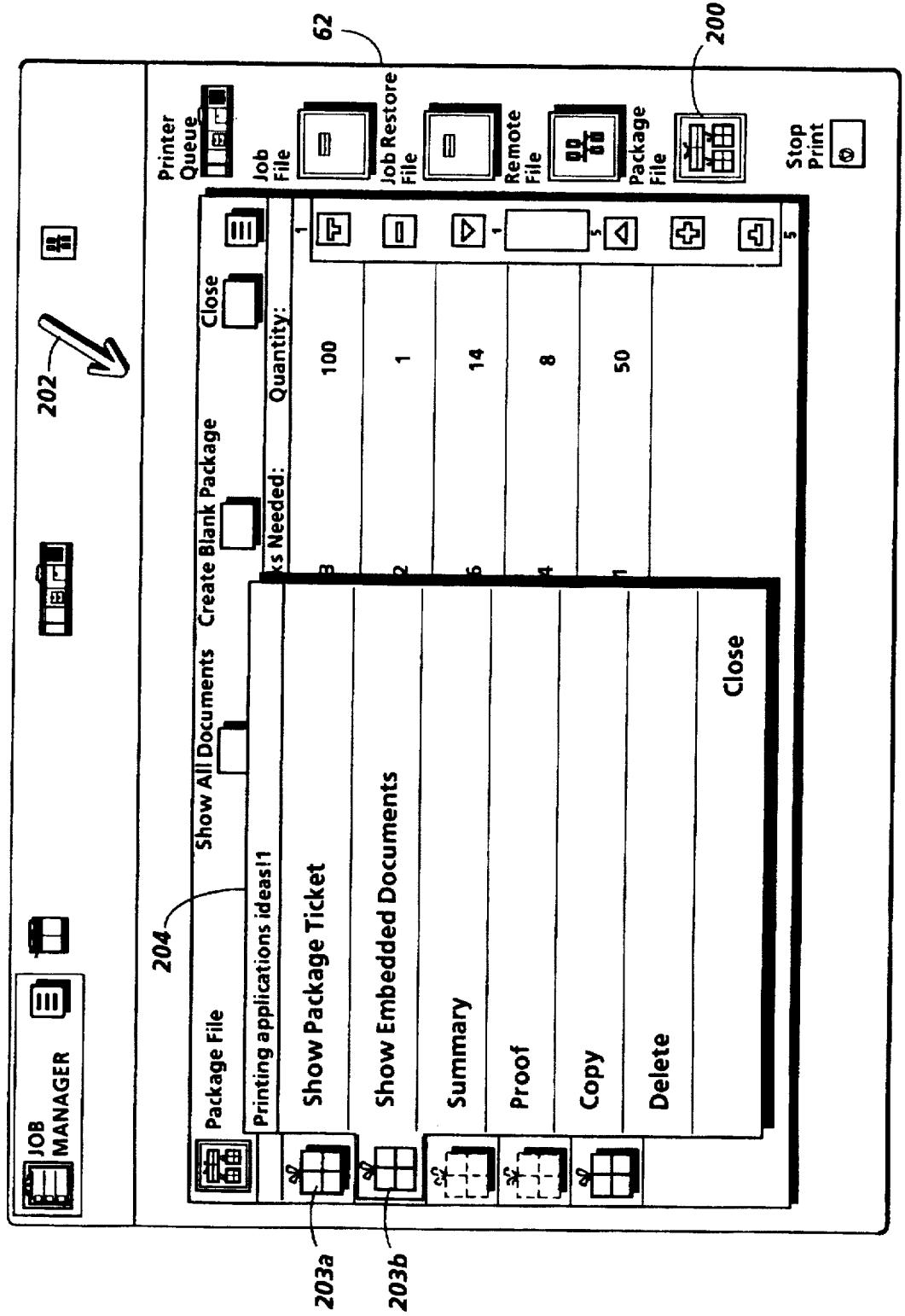
Figure 14:
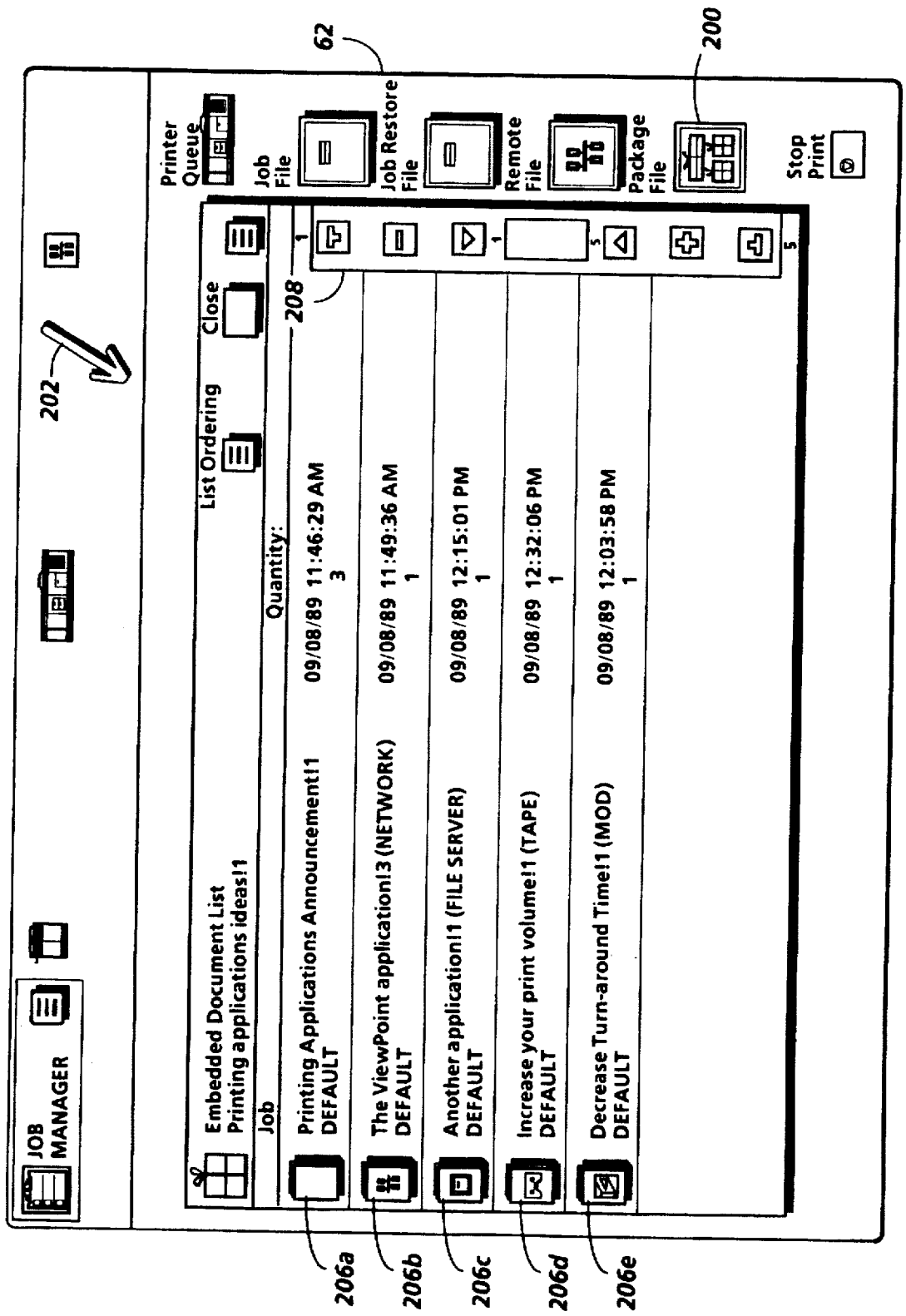
Figure 15:
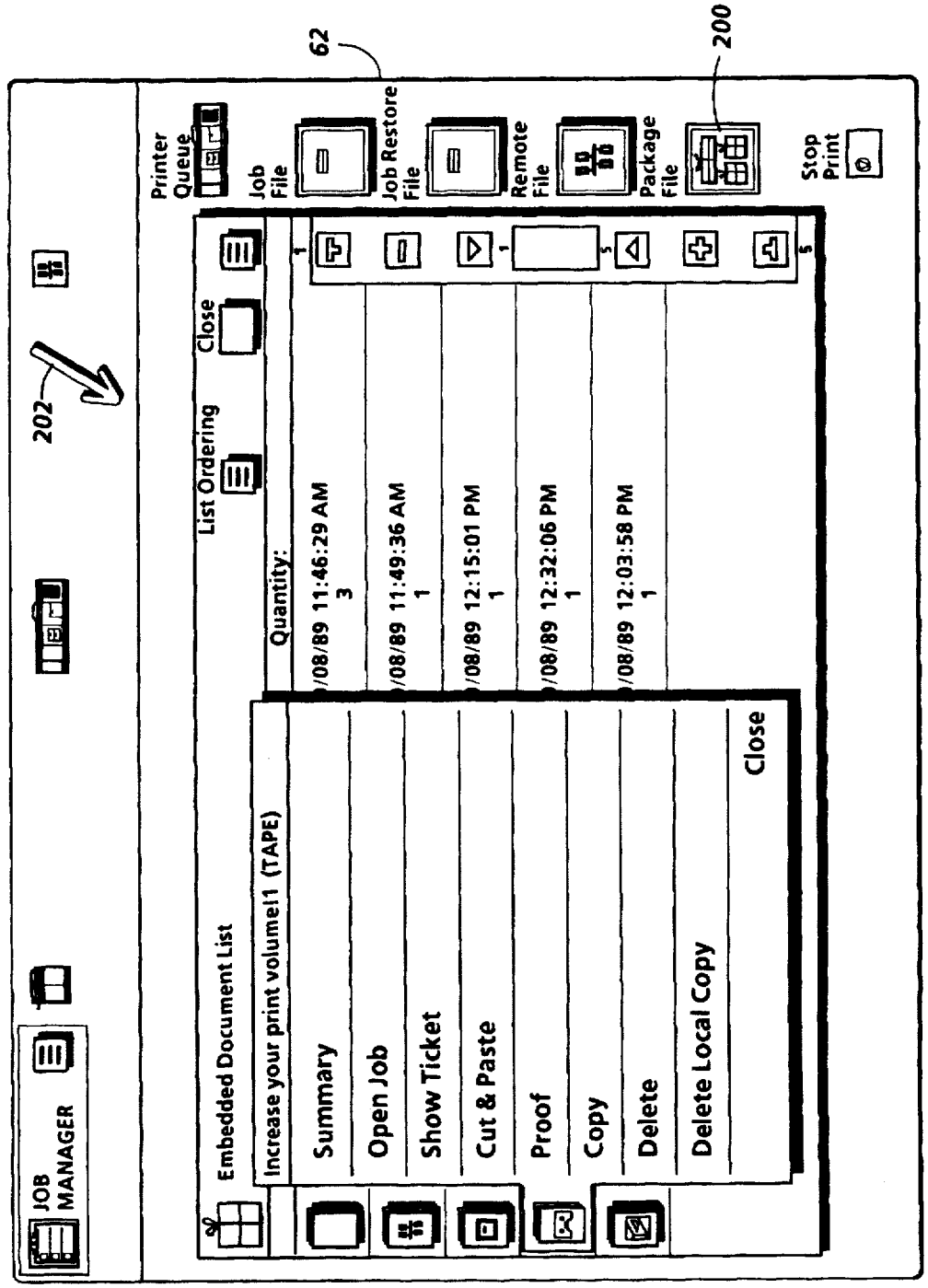
Figure 16:
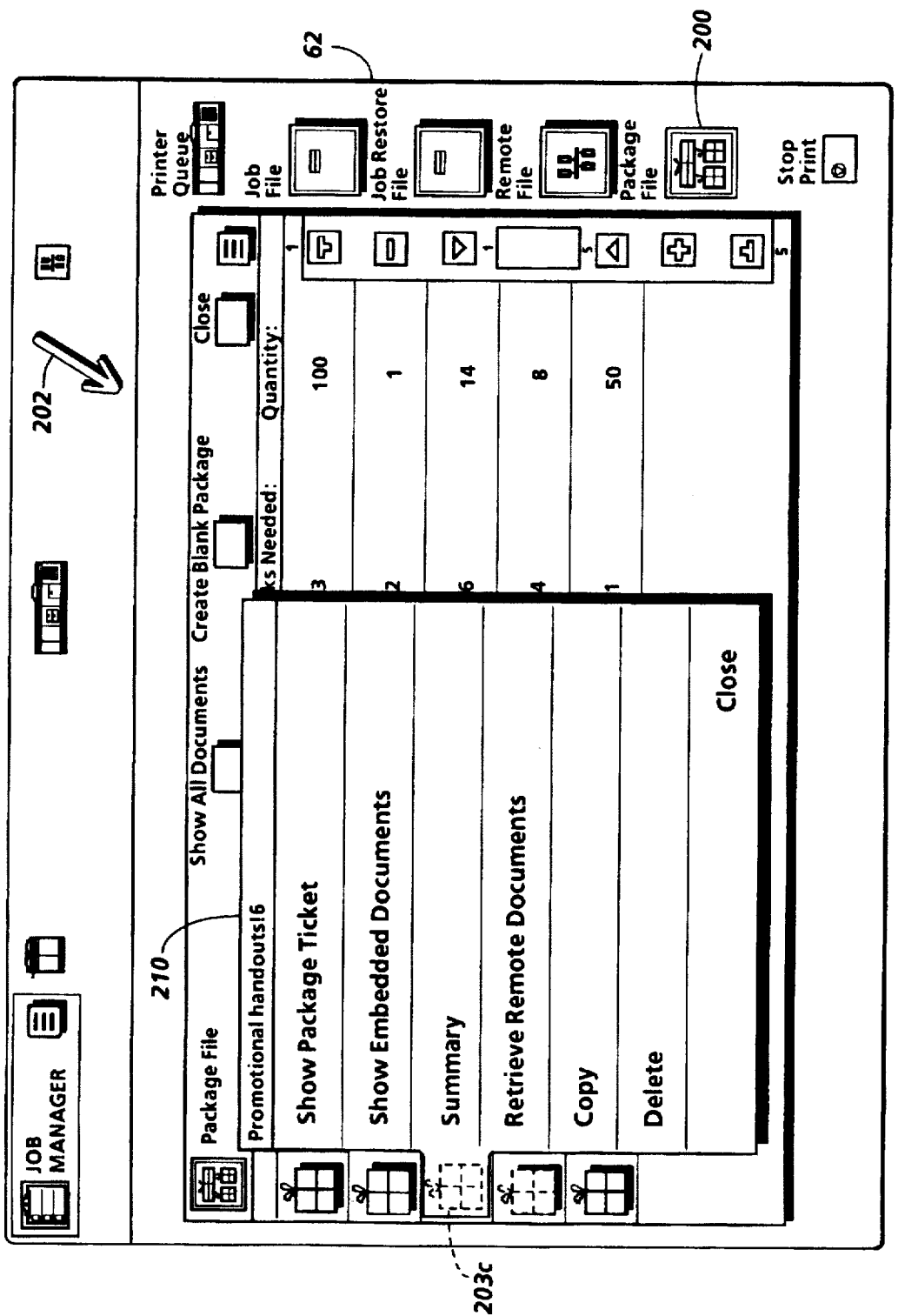
Figure 17:
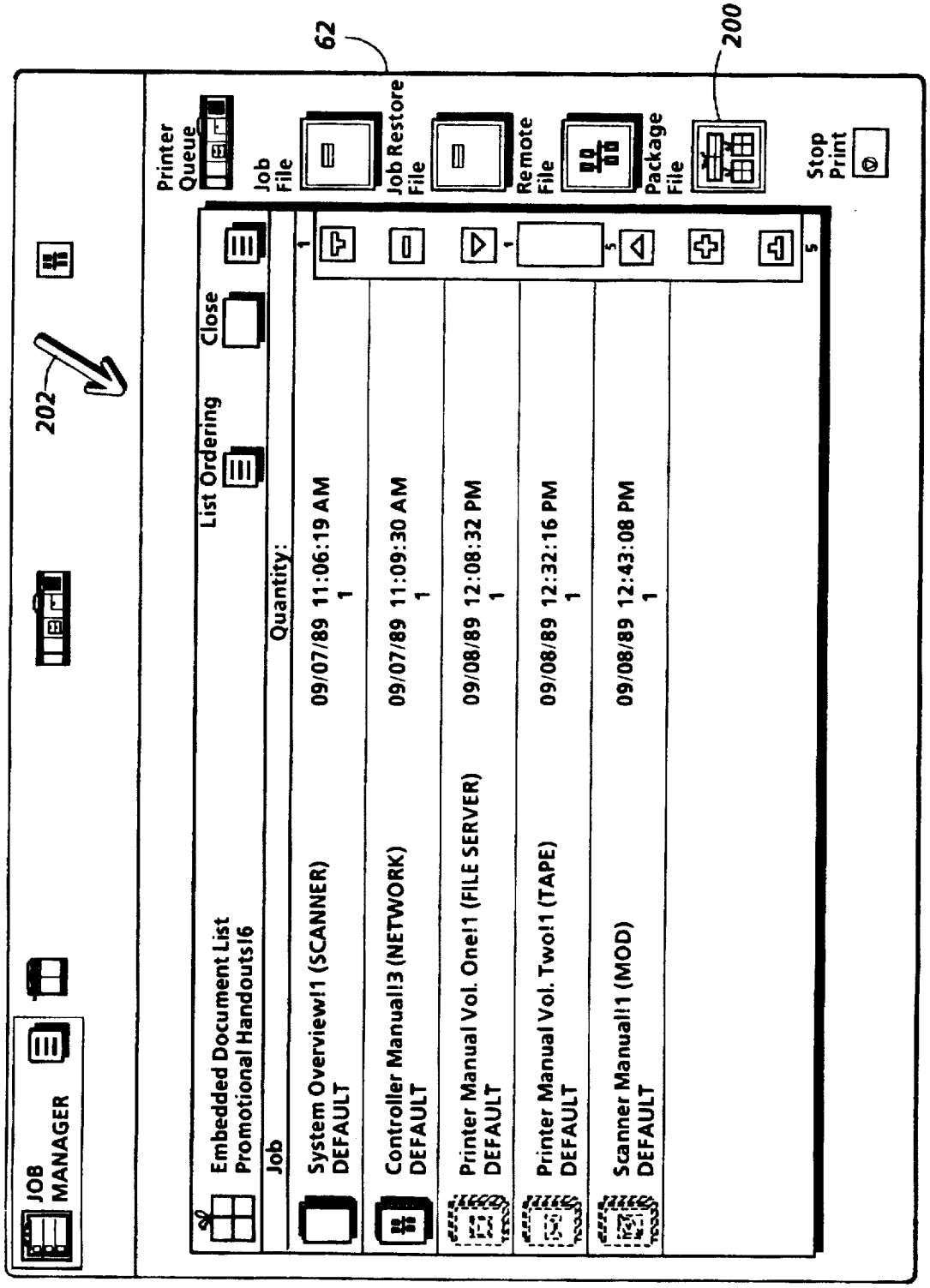
Figure 18:
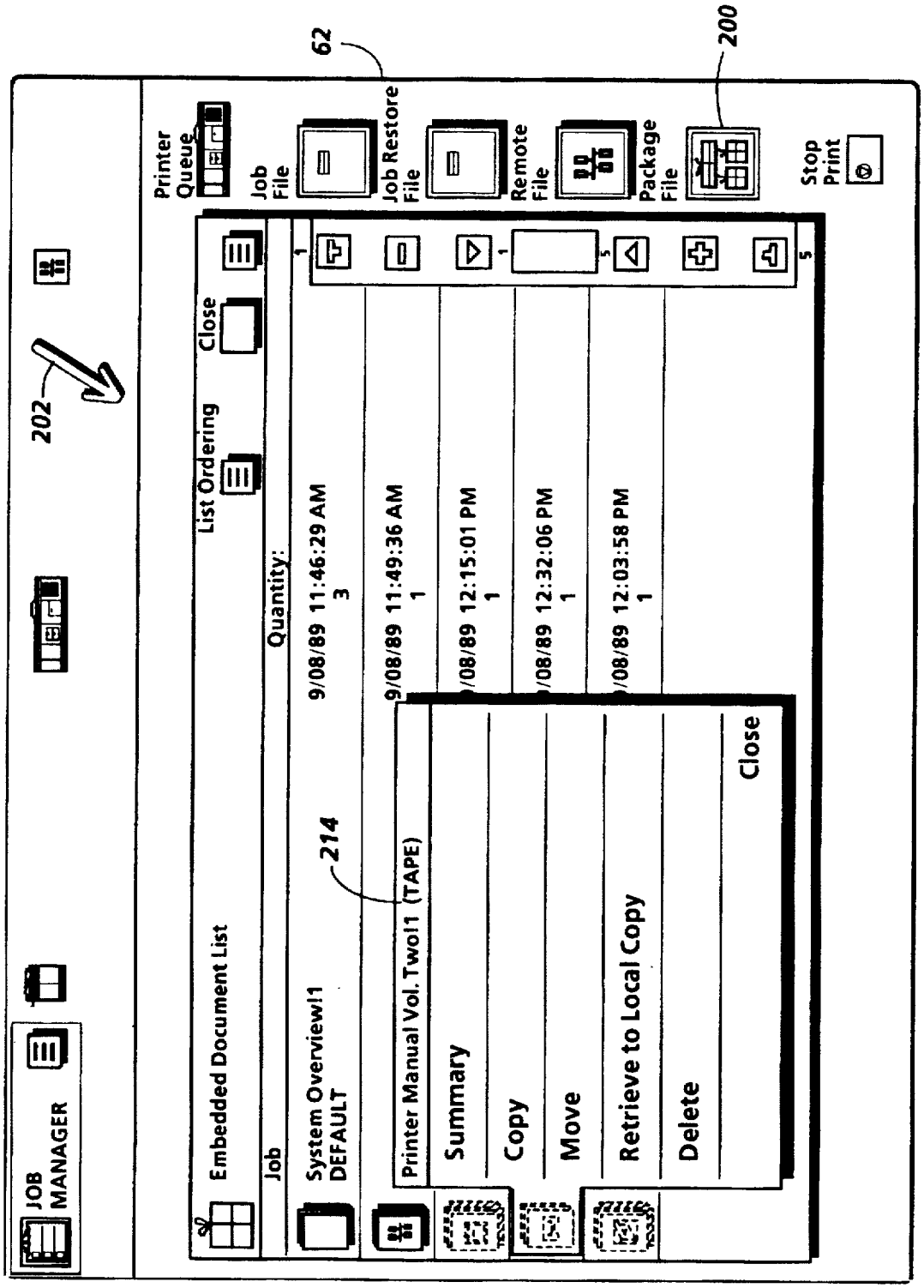
Figure 19:
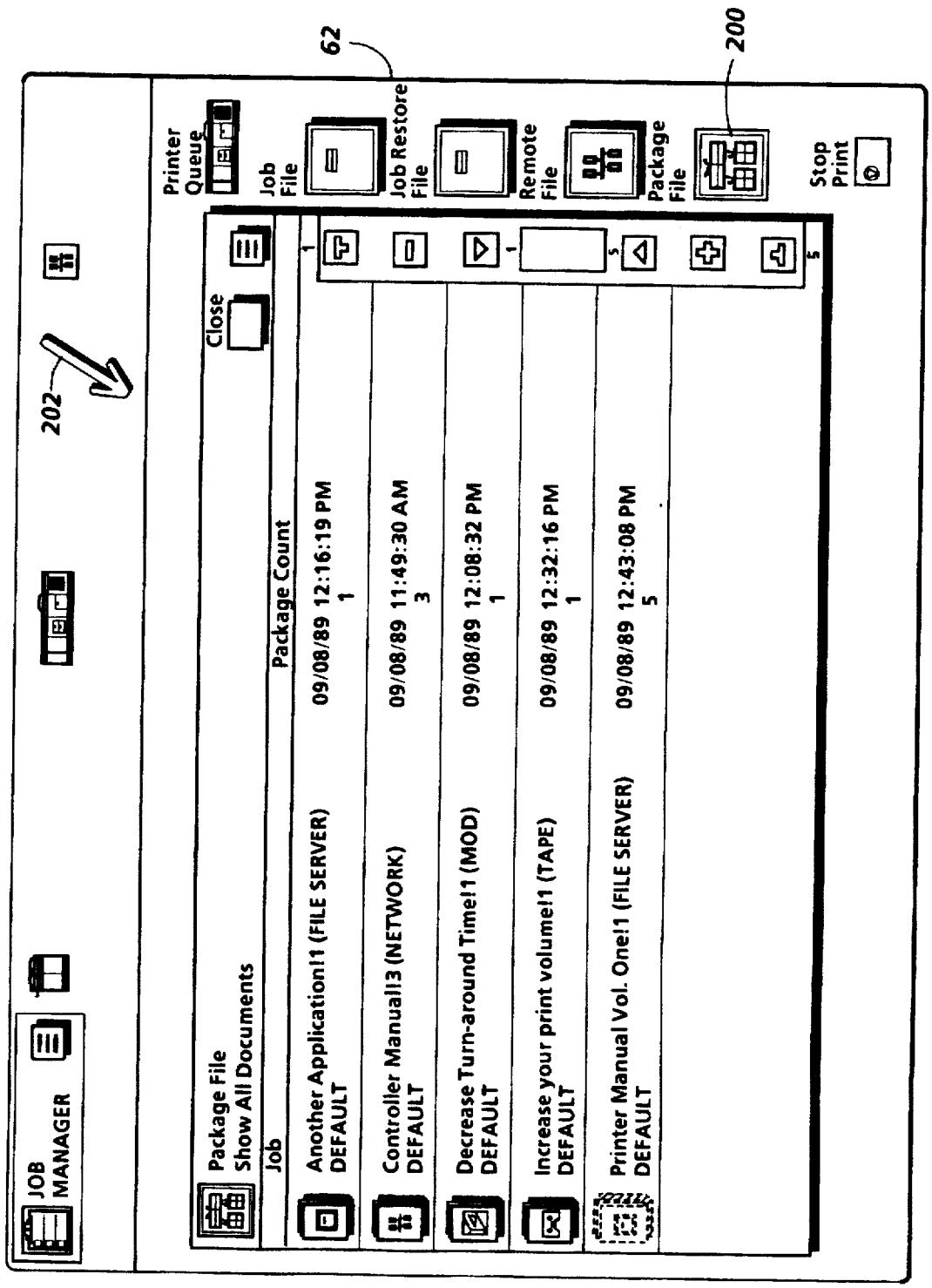
Figure 20:
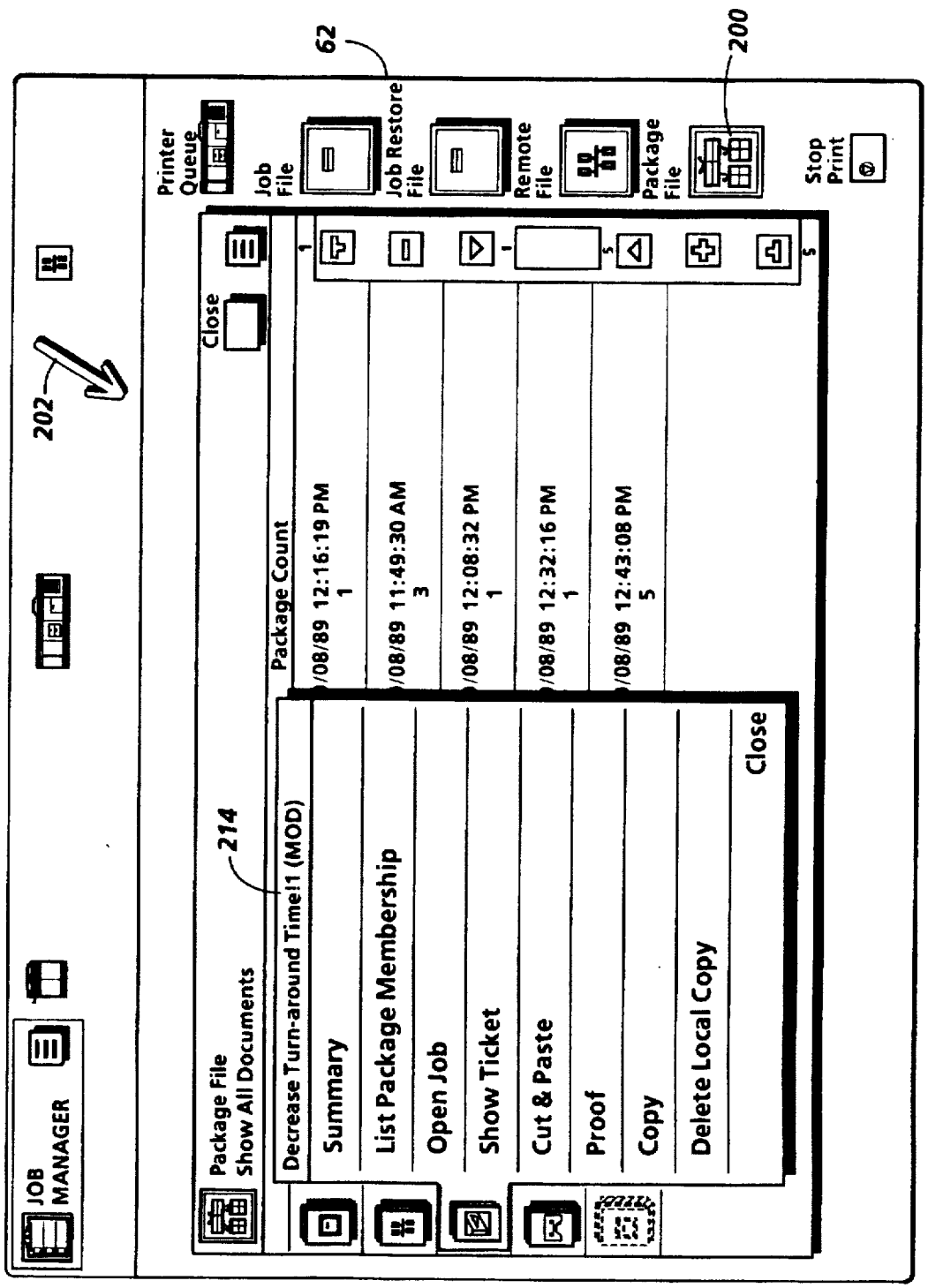
Figure 21:
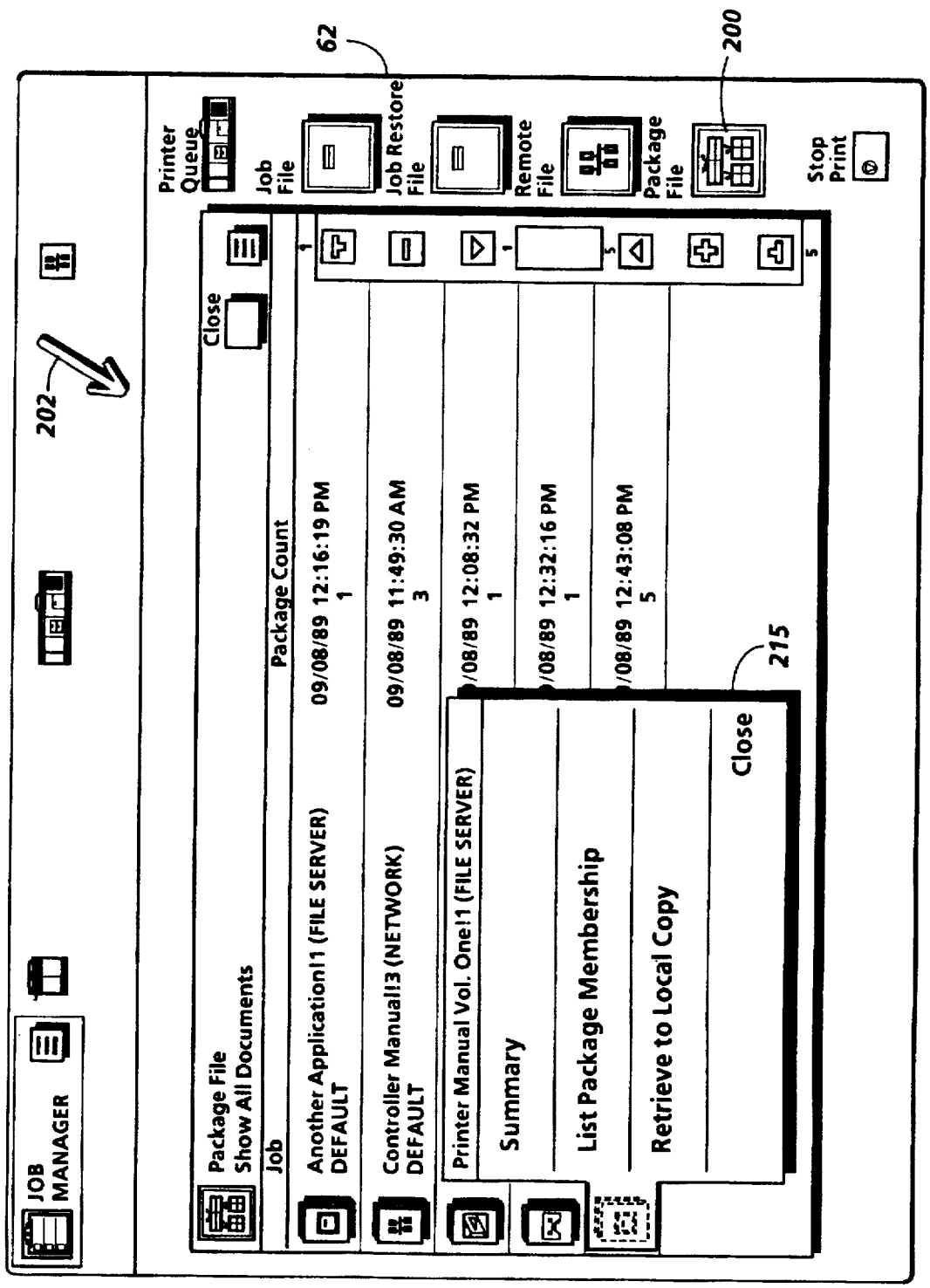
Figure 22:
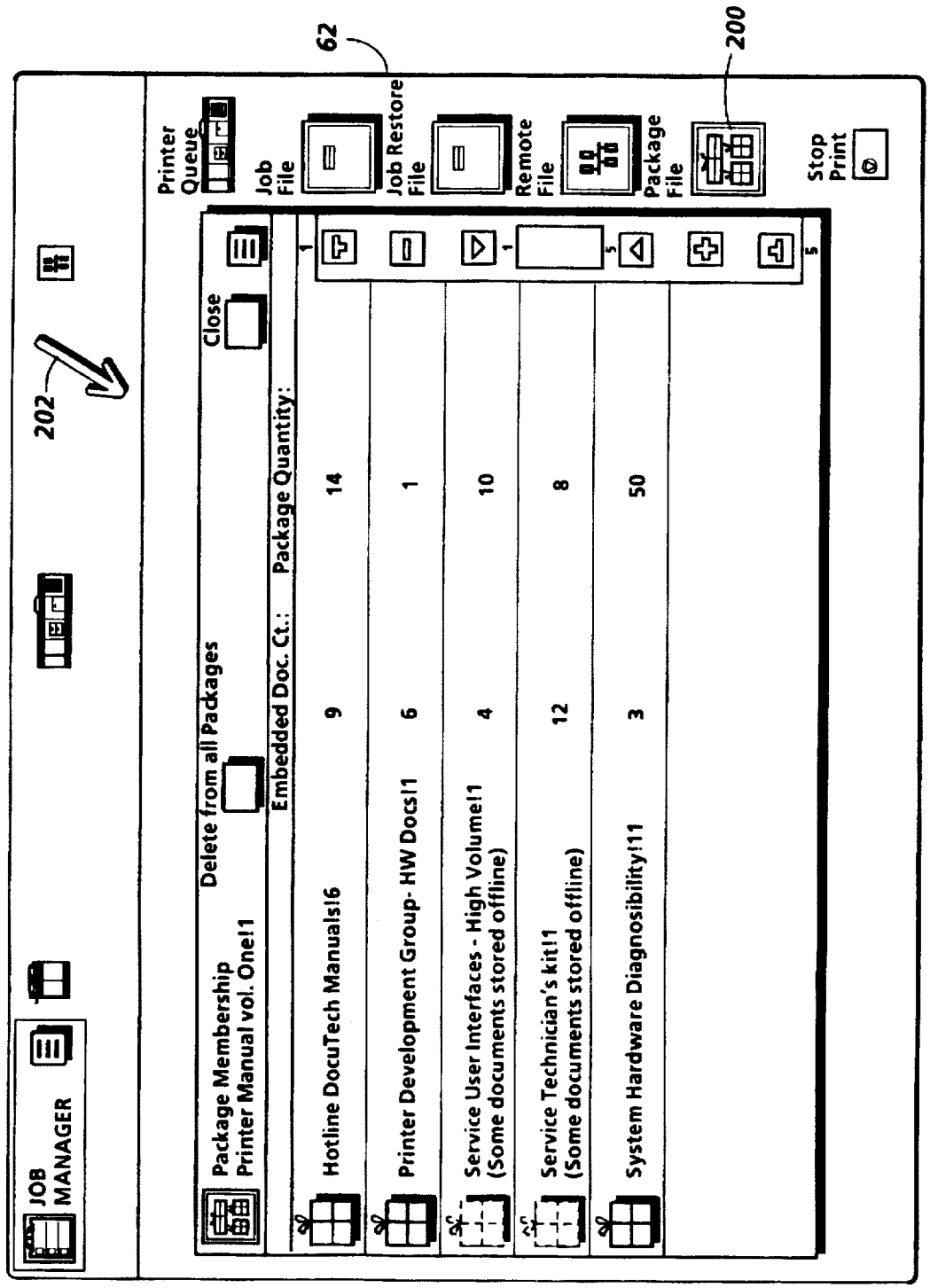
Figure 23:
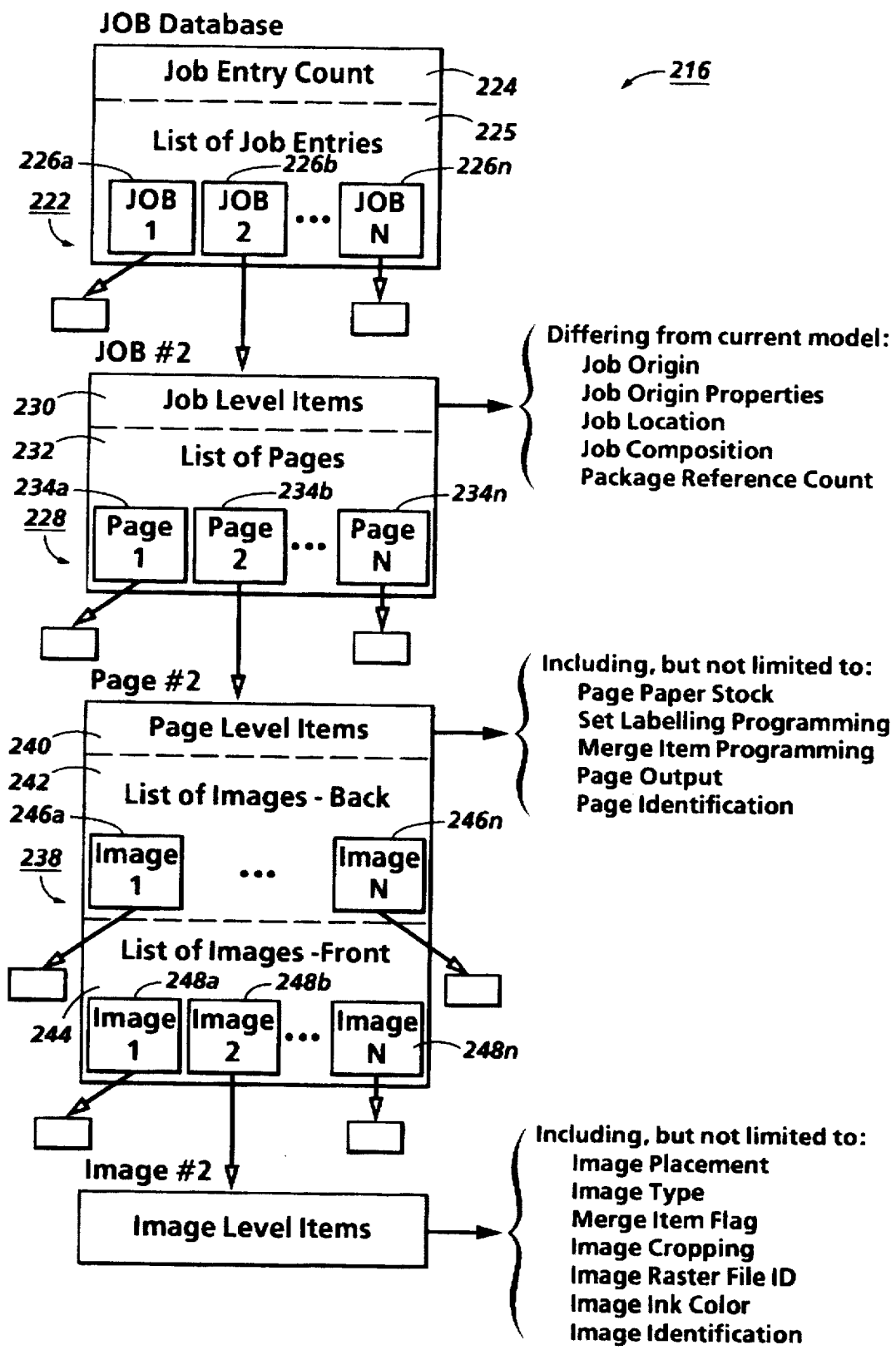
Figure 24:
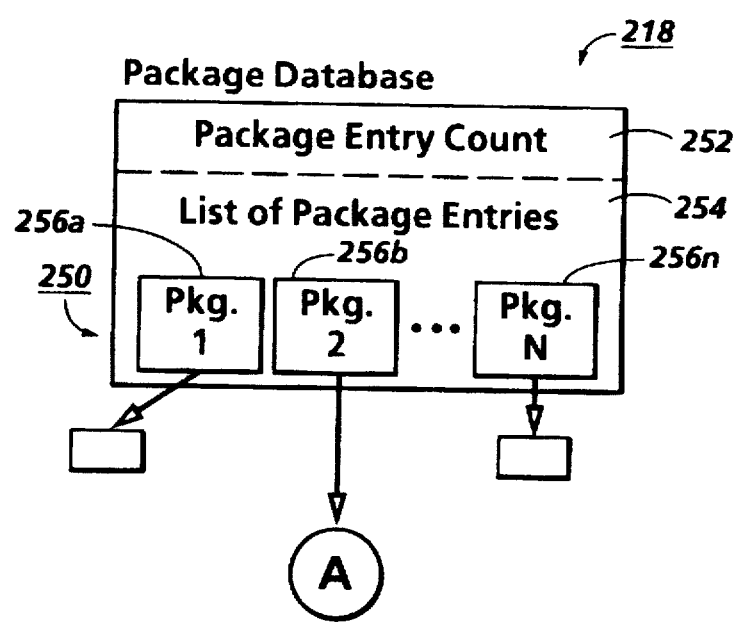
Figure 25:
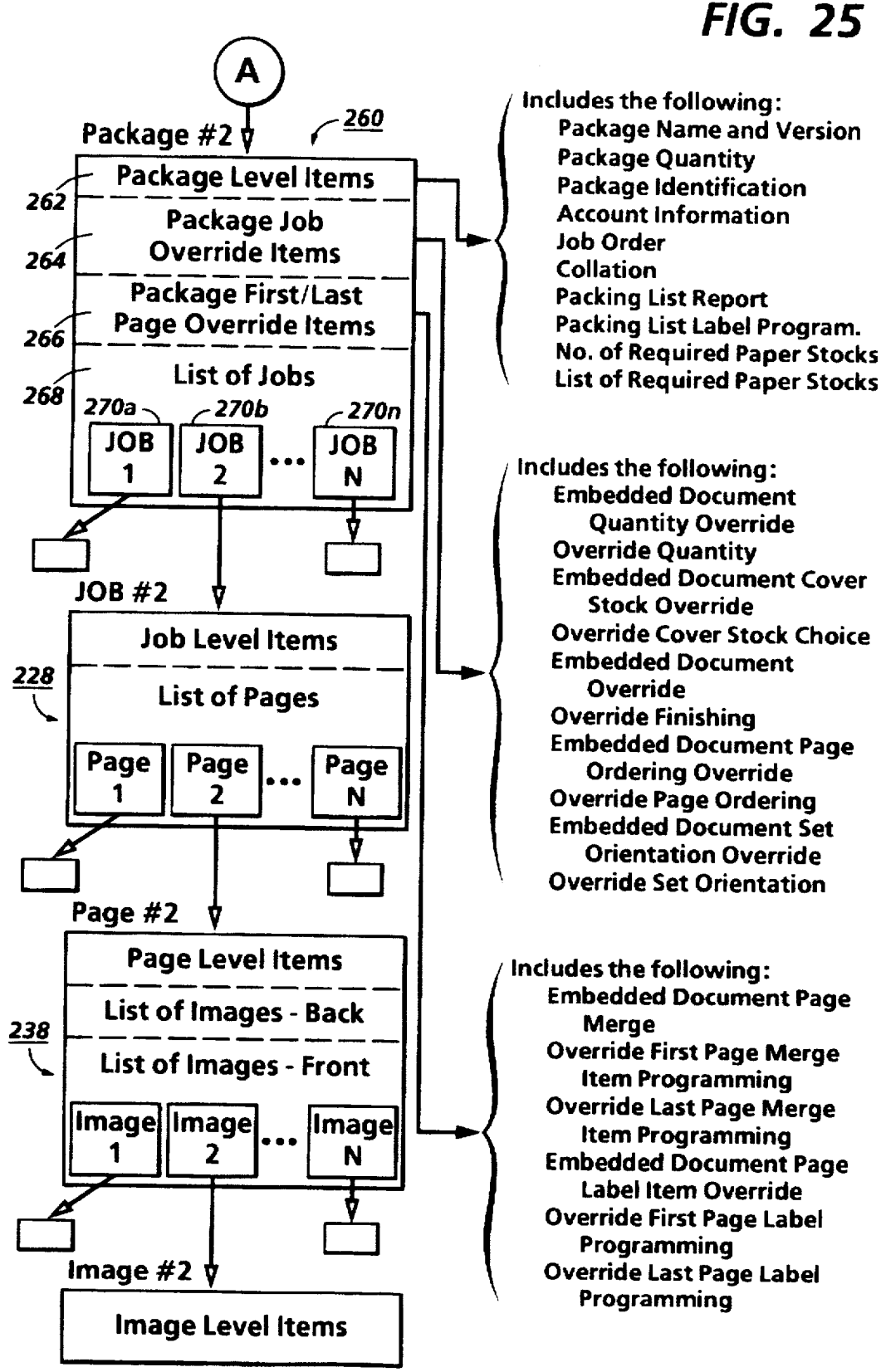
Figure 26:
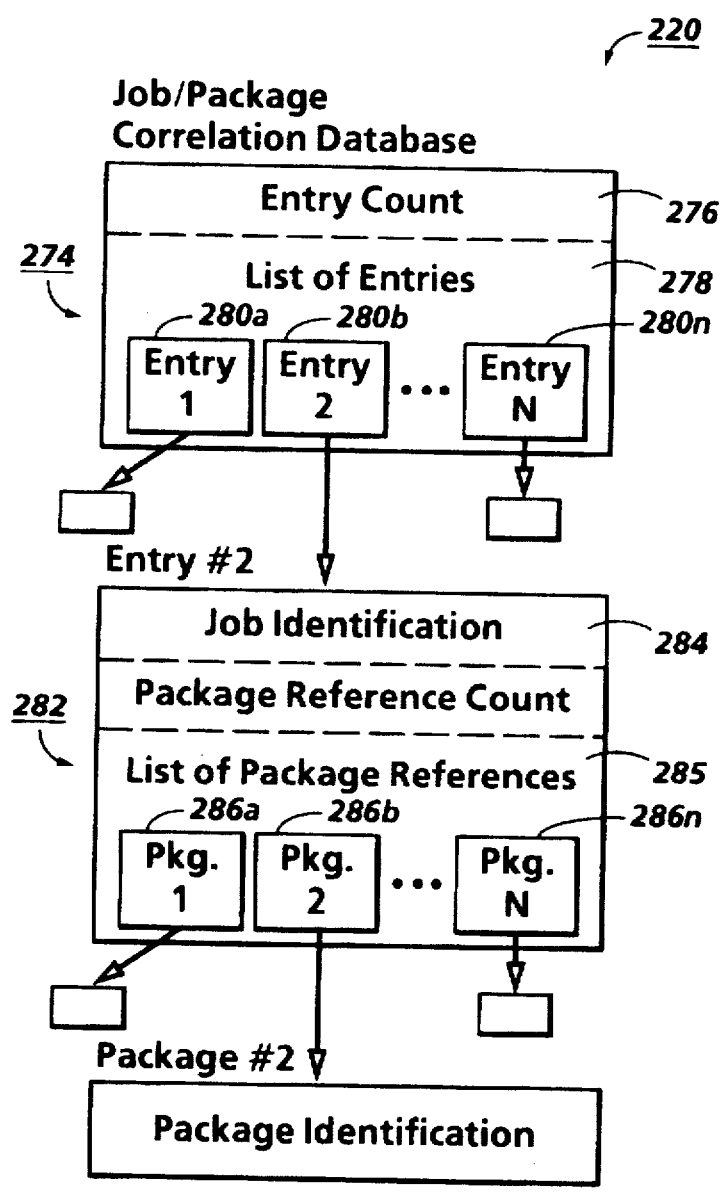
Figure 27:
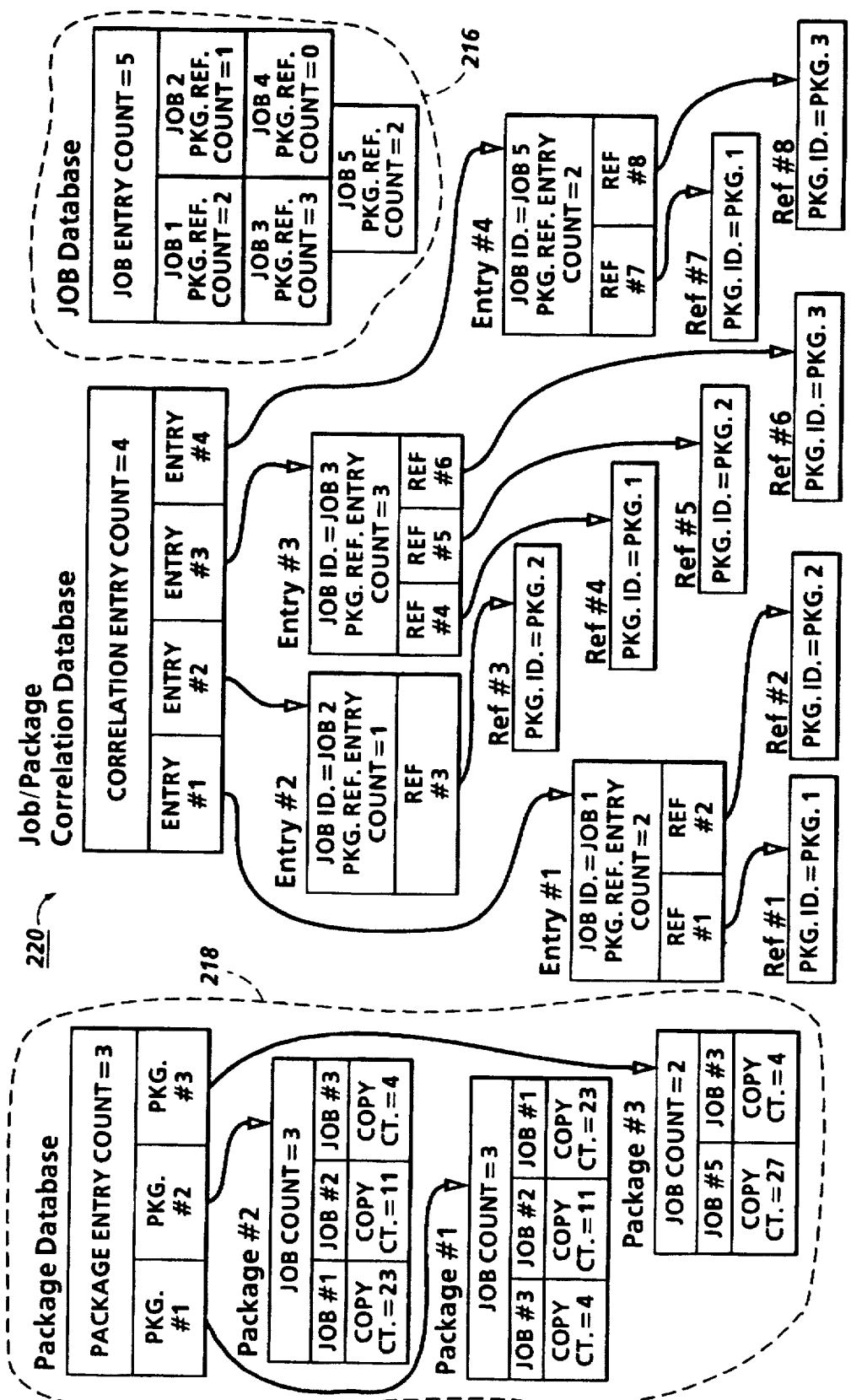
Figure 28:
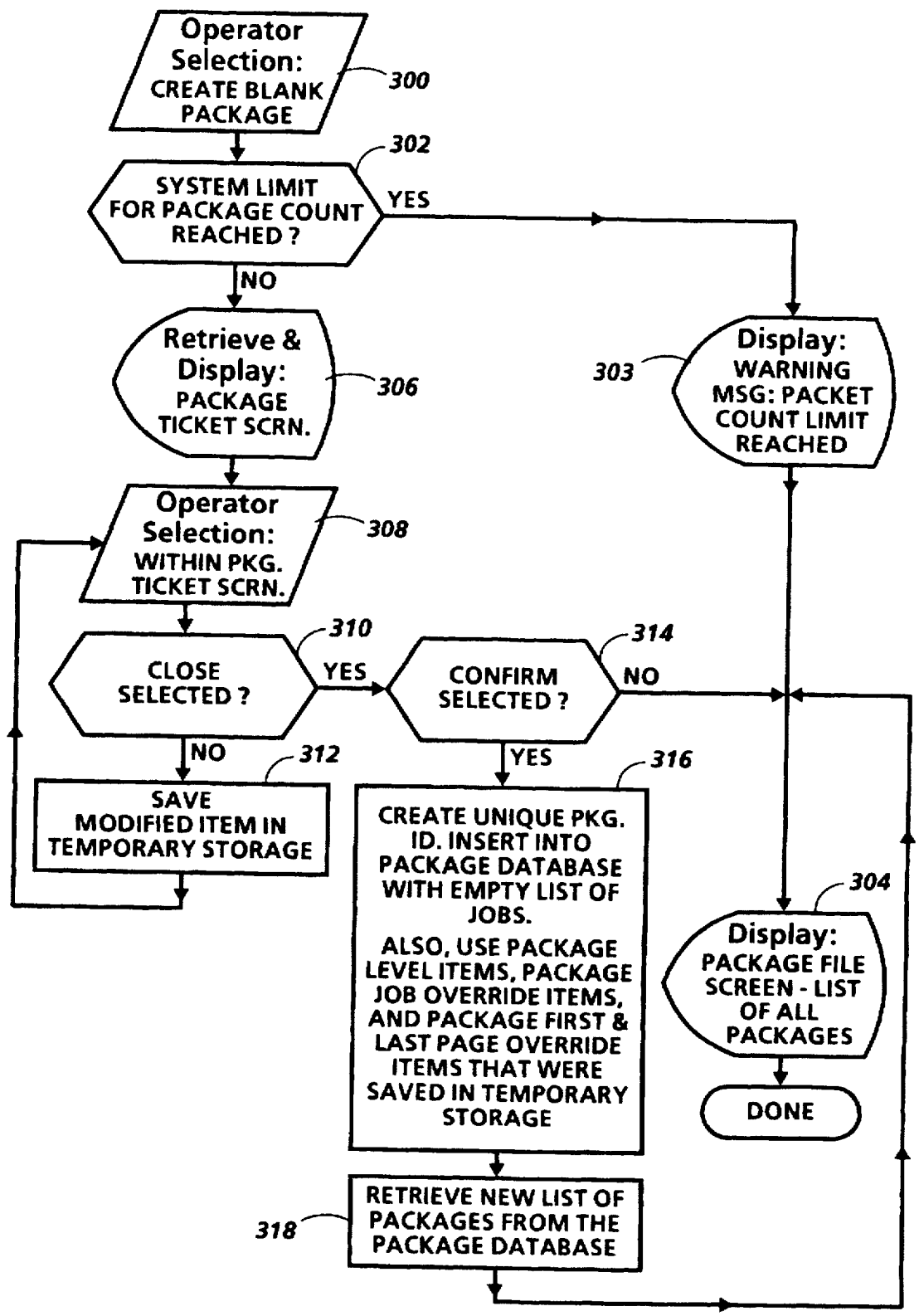
Figure 29:
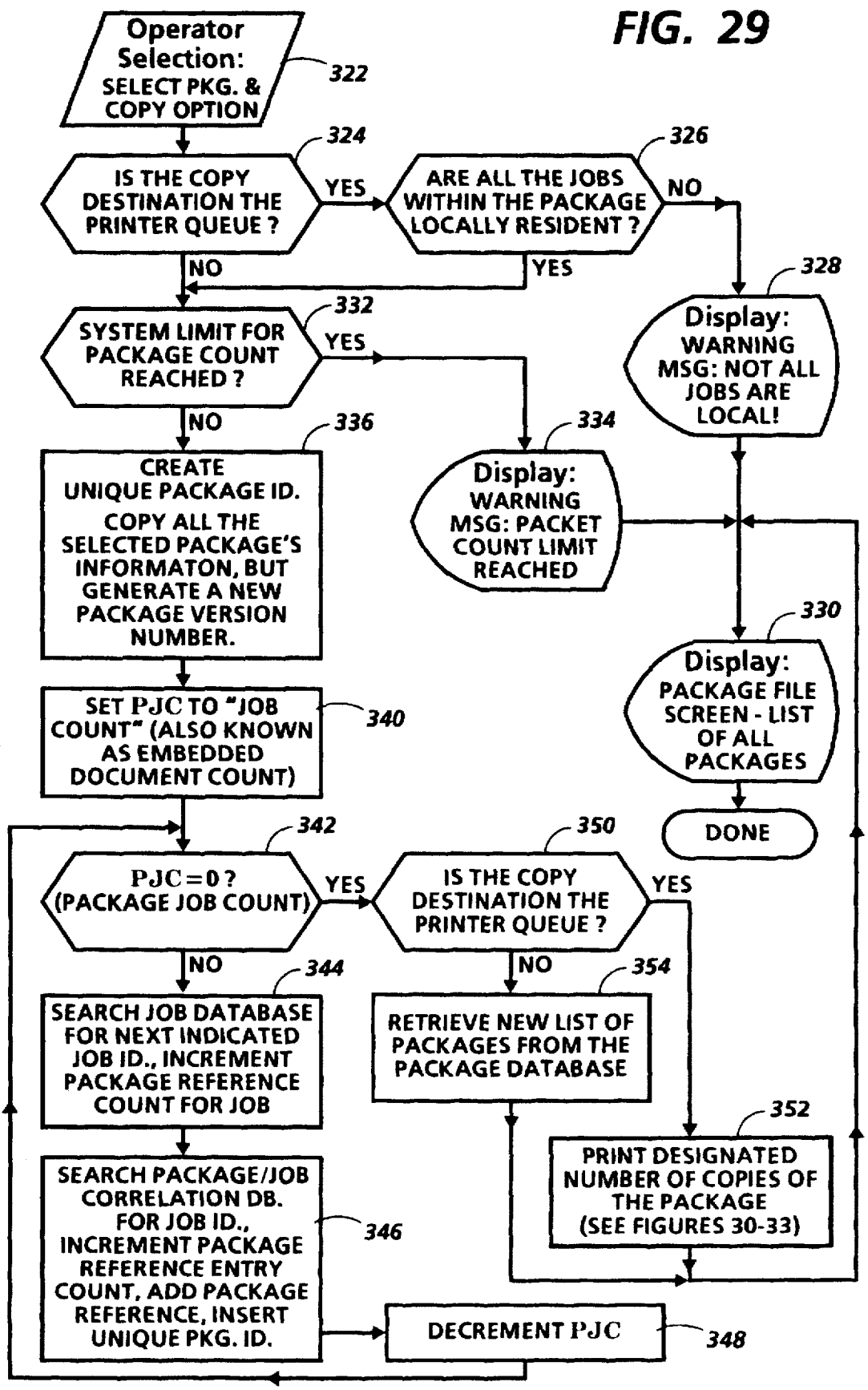

FIGS. 5–7 comprise a schematic block diagram showing the major parts of the control section for the printing system shown in FIG. 1;

FIG. 8 is a block diagram of the Operating System, together with Printed Wiring Boards and shared line connections for the printing system shown in FIG. 1;

FIG. 9 is a view depicting an exemplary job programming ticket and job scorecard displayed on the User Interface (UI) touchscreen of the printing system shown in FIG. 1;

FIG. 10 is a block diagram depicting a network printing system including the printing system of FIG. 2;

FIG. 11 is an elevational view of a screen in which a plurality of packages, with attendant information, is shown;

FIG. 12 is an elevational view of a screen in which a package ticket, for one of the packages of FIG. 11, is shown;

FIG. 13 is a view of the screen of FIG. 11 in which a selection template is applied to one of the packages;

FIG. 14 is an elevational view of a screen in which a plurality of jobs, associated with one of the packages of FIG. 11, is shown;

FIG. 15 is a view of the screen of FIG. 14 in which a selection template is applied to one of the jobs;

FIG. 16 is a view of the screen of FIG. 11 in which a selection template is applied to one of the packages;

FIG. 17 is an elevational view of a screen in which a plurality of jobs, associated with one of the packages of FIG. 11, is shown;

FIG. 18 is a view of the screen of FIG. 17 in which a selection template is applied to one of the jobs;

FIG. 19 is an elevational view of a screen in which the jobs, associated with the packages of FIG. 11, are shown;

FIG. 20 is a view of the screen of FIG. 19 is which a selection template is applied to one of the jobs;

FIG. 21 is a view of the screen of FIG. 19 in which a selection template is applied to one of the jobs;

FIG. 22 is an elevational view of a screen in which all of the packages, associated with one of the jobs of FIG. 19, is shown;

FIG. 23 is a schematic view of a job database;

FIGS. 24 and 25 represent a schematic view of a package database;

FIG. 26 is a schematic view of a job/package correlation database;

FIG. 27 is schmatic view representing an exemplary arrangement including the databases of FIGS. 23–26;

FIG. 28 is a flow diagram illustrating a technique for creating a package;

FIG. 29 is a flow diagram illustrating a technique for copying a package; and

FIGS. 30–33 represent a flow diagram illustrating a manner in which a package is prepared for output.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
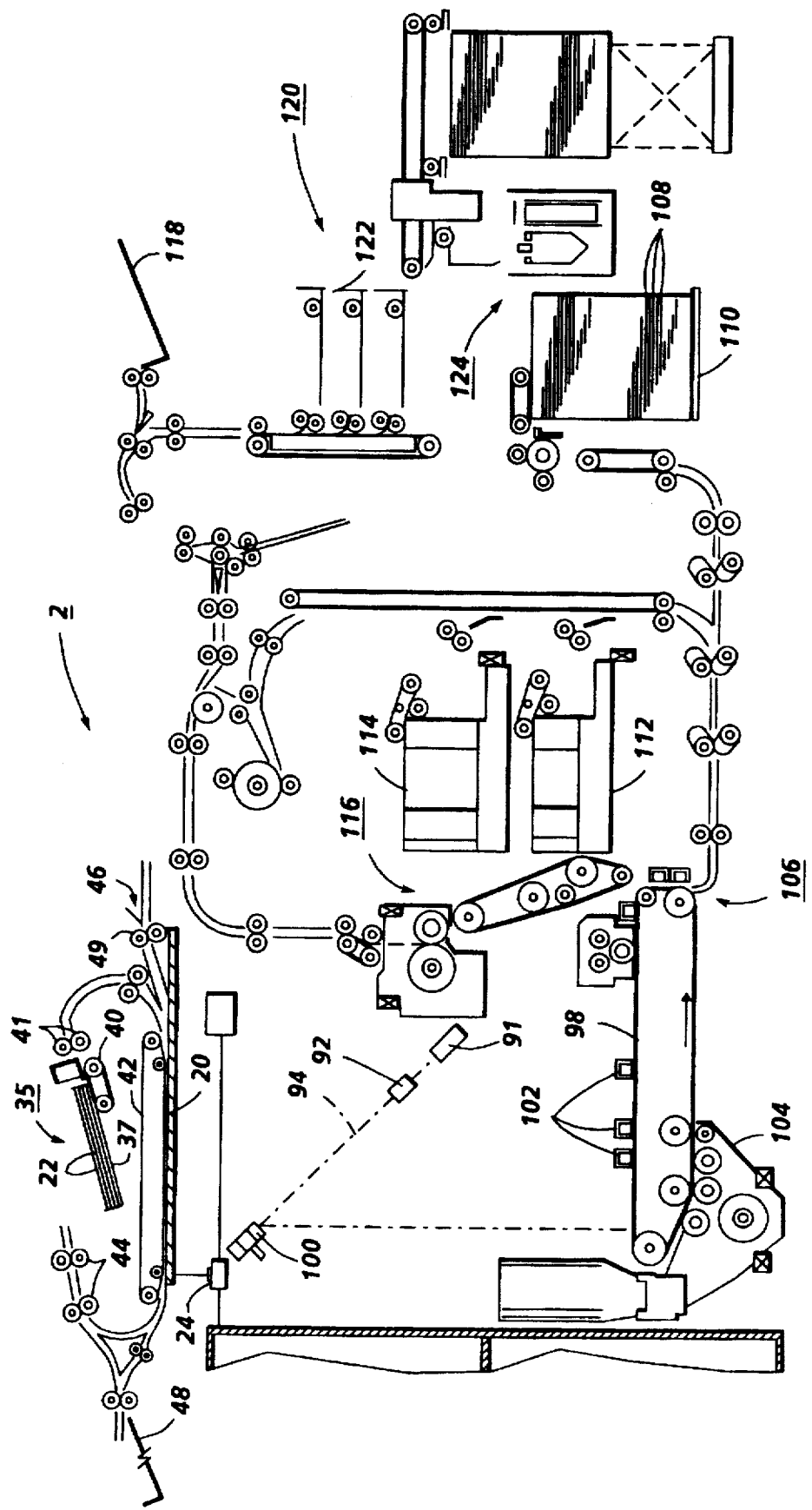
FIG. 3 is an elevational view illustrating the principal mechanical components of the printing system shown in FIG. 1.
Figure 4:
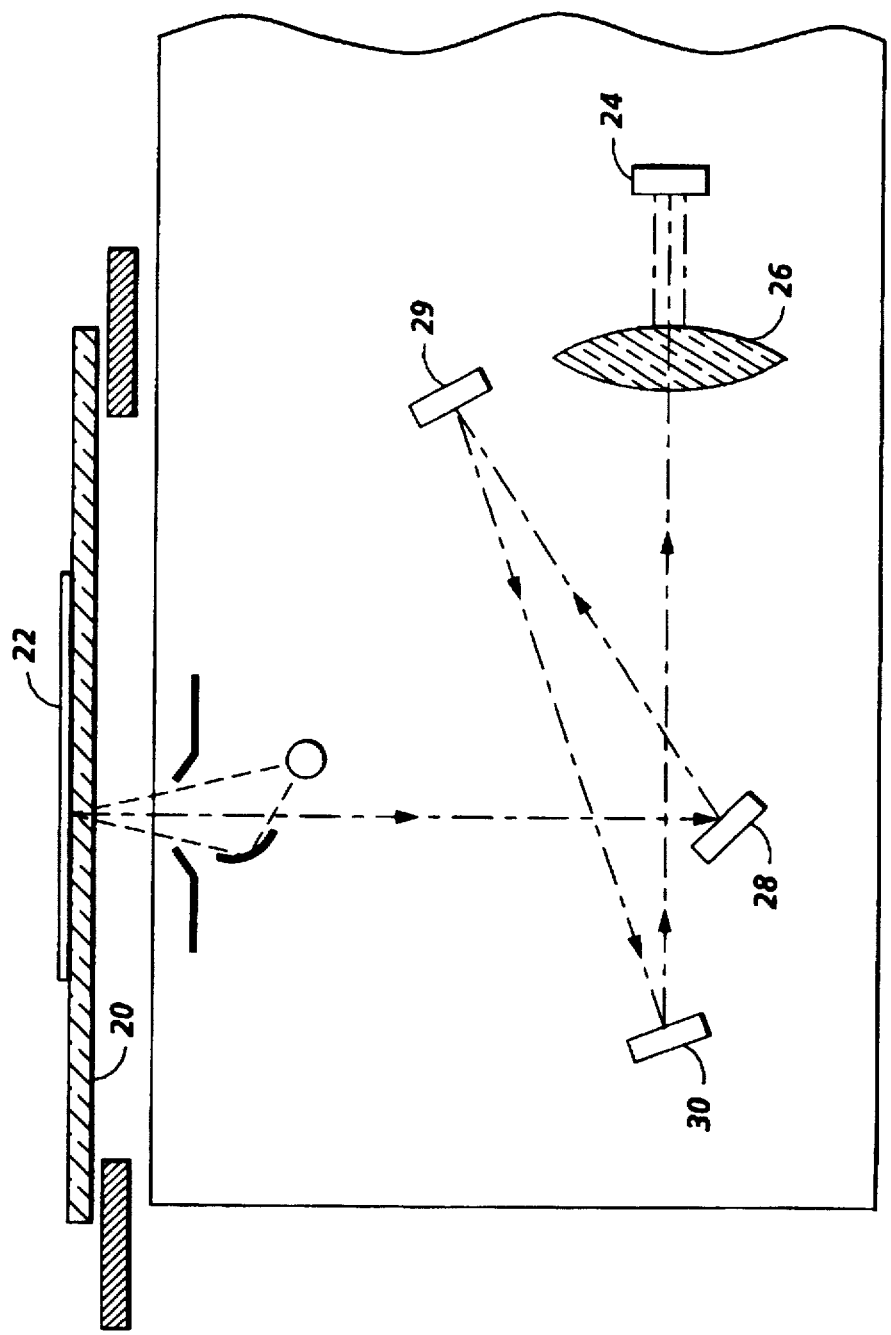
FIG. 4 is a schematic view showing certain construction details of the document scanner for the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movements below platen 20. Lens 26 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Referring particularly to FIGS. 5-7, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses, 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 (FIG. 9) to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIG. 8, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 9, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. The account 154 for the print job is the default account in FIG. 9. Thus, the preprogrammed billing rates for the various functions will be tabulated for the specific print job, unless a particular account with corresponding billing rates is specified by the system operator.

Referring to FIG. 10, the controller 7 is coupled with a network arrangement 170 by way of a network interface 172. The network interface 172 includes all of the hardware and software necessary to relate the hardware/software components of the controller 7 with the hardware/software components of the network arrangement 170. For instance, to interface various protocols between the server and the network arrangement, the network interface could be provided with, among other software, Netware® from Novell Corp.

In the network arrangement 170, various I/O and storage devices are interconnected with a bus 174. In particular, the devices include, among others the following: I/O Apparatuses 176, Print Services 178, Scan Services 180 and Tape Storage Devices 182. In the present example a given I/O Apparatus includes a workstation, such as any suitable PC compatible apparatus or a 6085 workstation manufactured by Xerox Corporation.

In one embodiment, the printing system 2 is a DocuTech® Network Printing System ("Network Printer") which prints jobs transmitted from one of the I/O apparatuses 176. In one embodiment, the Network Printer processes network jobs written in a page description language ("PDL") known as "Interpress" and as a prerequisite to printing the network job, the Network Printer decomposes the job from a high level primitive form to a lower level primitive form. The decomposition process is discussed in further detail in U.S. application Ser. No. 07/898,761 entitled "Apparatus and Method for Multi-Stage/Multi-Process Decomposing", filed on Jun. 12, 1992, by Bonk et al., the pertinent portions of which are incorporated herein by reference. In another embodiment the Network Printer is used, in conjunction with a DocuTech® Network Server, see Print Services 178, to print jobs written in, among other PDLs, Postscript®. The structure and operation of the DocuTech® Network Server may be more fully comprehended by reference to U.S. Pat. No. 5,226,112 to Mensing et al., the pertinent portions of which are incorporated herein by reference. Decomposed jobs are commonly stored, for output, in a job file of the Network Printer and later transferred to a print queue for printing. Further discussion of a printing system with a job file and a print queue is provided in U.S. Pat. No. 5,206,735 to Gauronski et al., the pertinent portions of which are incorporated herein by reference.

Preferably, one of the Scan Services 180 includes a workstation and a scanner, provided in the form of a package. This sort of package is made available by Xerox Corporation in the form of a DocuCM 620 scanner coupled with a 6085 workstation. It will be appreciated that the Scan Service is preferably provided with Optical Character Recognition ("OCR") capability so that the user of the controller 7 can scan hard-copy, such as a sheet referred to as "Paper UI", for use by the controller 7. As is known, the Paper UI can be used to provide a controller with appropriate directives, regarding a job, such as printing instructions. An example of Paper UI, and its application can be obtained by reference to U.S. Pat. No. 5,051,779 to Hikawa, the pertinent portions of which are incorporated herein by reference.

Each of the Tape Storage Devices 182 preferably includes a tape drive device of the type employing magnetic tape. One example of a networked Tape Storage Device, suitable for use with the printing system 2, is a commercially available Xerox tape drive device adapted for use with Xerox® 6085 workstations. It will be understood that other storage devices would be suitable for use with the printing system 2. Referring still to FIG. 10, in one example, detachable memory 184, such as streaming tape of floppy disk is preferably coupled with the controller through use of a suitable interface 186. In another example, Magneto-optical disk is used in conjunction with the controller.

Referring to FIGS. 11–22, a general overview of a method for managing multiple jobs, with packages, is described. As should be recognized, each of FIGS. 11–22 represents a dialog (or screen) which is preferably, selectively displayed on the display 62 (FIG. 1). Referring specifically to FIG. 11, to access a list of packages in the printing controller 7, a job manager screen is brought up on the UI display 62. When a package file icon 200 is selected, with a cursor 202, a list of all packages (FIG. 12) is displayed. Each package entry, designated by a package icon 203, preferably indicates the number of paper stocks required to print the package, the number of embedded documents or jobs in the package and the quantity of packages to be produced. Additionally, each icon 203 itself imparts information regarding the origin of the embedded documents associated therewith. More particularly, if the icon is drawn with solid black lines, then all of the embedded documents of the corresponding package reside in mass memory 56, i.e. on disk. On the other hand, if the icon is drawn with gray dashed lines, then at least one of the embedded documents of the corresponding package is disposed at a location remote from the controller 7, e.g. at a remote file/print server.

Referring to FIGS. 13 and 16, when one of the package icons 203 is selected, a property selection template 204 or 210 is displayed. By selecting a "Show Package Ticket" section with the cursor 202, various properties associated with the package/job managing method are shown (FIG. 12). The following discussion briefly describes the significance of each property shown in FIG. 12:

Package Identification: The unique name and version which identifies the package.

Package Quantity: The number of packages desired to be produced.

Output Options: Normally "Collated" is enabled, and this causes a complete package to be produced at a time. It is potentially much easier to run "Uncollated" when, for example, multiple stocks are present. Additionally, enablement of the uncollated option is useful when multiple jobs are to be delivered to separate finishing destinations.

Packing List Report; Packing List Labeling: When desired, a packing list report can be generated, which lists the names and quantities of the documents provided in a package. When desired, each package's packing list report can have unique data applied thereto, such as a mailing address. This is roughly equivalent to set labeling the first page of a job. Not available when the packing list report is disabled.

Number of Required Paper Stocks: The number of different paper stocks required to print a selected package.

Embedded Document Count: The number of embedded documents in a selected package.

Embedded Document Quantity Override: When enabled, this allows a parameter for a selected package, referred to as "Embedded Documents' Quantity" (referred to as just "Quantity" in, for example, FIG. 14) to be ignored; instead a parameter known as "Override Quantity" is substituted for each job in the selected package. One would expect a single copy of each document in the package (using the override feature), but there are applications where the customer would want different quantities of the individual documents in a package. An example of this would be a college course package which would have a single instructor's document and multiple student documents.

First Page Label Override: When selected, this allows all the documents' first page labeling, for a given package, to be ignored; instead all the documents' first page labeling would originate from the same source label document. The conceptual framework, underlying set labeling, will be discussed in further detail below.

Last Page Label Override: Similar in concept to First Page Override except that the override feature applies to labels applied to the last pages of a plurality of jobs. A warning will be issued if there are any single page embedded documents in the given package and the First Page Label Override is enabled.

Embedded Document First Page Merge Item: Similar in concept to the First Page Label Override except that a selected merge item, rather than a label, is positioned at a selected position on the first page of each embedded document.

Embedded Document Last Page Merge Item: Similar in concept to the Embedded Document First Page Merge Item.

Embedded Document Cover Stock Override: When enabled, this allows all the documents' Cover Stock properties (Type and color) to be ignored; instead, the Embedded Document Cover Stock is substituted. This allows the operator to cut down on the number of paper stocks needed to produce a package, without tediously changing the cover stocks on each embedded document. Preferably, for each cover stock size in a package, the Type and Color to be used in place of the embedded documents' cover stock is programmed Referring specifically to FIGS. 13–15, the dialogs associated with managing a local package, i.e. a package whose respective embedded documents are all stored locally at the controller 7 (preferably in mass memory 56 (FIGS. 2 and 7)), will be discussed in further detail. The Property Selection Template 204 includes the Show Package Ticket section as well as "Show Embedded Documents", "Summary", "Proof", "Copy", "Proof" and "Delete" sections. The function of the Show Package Ticket section has been discussed above and the Delete section permits the deletion of a selected package, with its attendant embedded documents. The Summary section provides pertinent read only information regarding a selected package, such information being generated from, among other sources, the package properties discussed above. The significance of the Copy section will become clear from a discussion of related software below. The Proof section uses the functionality of the Copy section, in part, to produce a proof copy of a selected package.

Referring to FIG. 14, embedded documents of a given package are provided when the Show Embedded Documents section (FIG. 13) is selected with the cursor 202. Each of the documents associated with the package known as "Printing applications ideas!1" (see FIGS. 12 and 13) are shown. As will be noted, each job is represented by a job icon 206, i.e. 206a, 206b, . . . 206n, each of which icon preferably indicates information regarding history of a corresponding embedded document, i.e. whether the source of the job is from, among other places, the scanner 6 (see Job 206a), the network 170 (see Job 206b), a system queue (not shown) (see Job 206c), a magnetic tape source 182 (see Job 206d) or a magneto-optical disk ("MOD") (not shown) (see Job 206e). When all of the documents for a given package cannot be fitted on a screen, a scrolling section 208 can be used to vary the information displayed on the screen. Each job or embedded document for a given package preferably includes a job name, with it version number e.g. "Printing Applications Announcement!1, an account listing (e.g. "Default"), a date/time indicator relating to when the embedded document was generated and a quantity indicator, designating the number of sets to be produced for the particular job.

Referring to FIG. 15, the options available for handling local documents are exactly the same as for documents in a DocuTech® Job File, including "Show Ticket", "Cut & Paste" and "Delete". However, once a local document is altered in any way, the icon loses its ability to show history (i.e. whether it is from Tape, MOD or Remote FileServer) and revert to either a Scanned Job or Network Job. Additionally, if the local document's history indicates that the document came from a remote source, the option to delete the local copy is available. Deleting the local copy of a document, with a remote source, from the package, would not actually delete the document from the package, but, would instead, merely restore the document's history to the remote source.

Referring to FIG. 16, the package icon 203c (see FIG. 11), corresponding with a package including one or more embedded documents from a remote source, is shown as being selected with a Property Selection Template 210. The Template 210 includes the same sections as Template 204 except that Template 210 does not include a proof section and does include a "Retrieve Remote Documents" section. The purpose of the Retrieve Remote Documents Section, which should become clear from the discussion below, is to retrieve one or more documents from a remote source to complete the package for purposes of printing the same at the local printer. Referring to both FIGS. 16 and 17, upon selecting the Show Embedded Documents section of Property Selection Template 210, the attendant embedded documents are displayed. The screen of FIG. 17 includes the same type of information that is provided by the screen of FIG. 14, except that some of the documents in FIG. 17 are shown with dashed lines to indicate that certain documents exist at remote sources. As shown in the illustrated embodiment of FIG. 18, the options available for handling remote documents are much more limited than for local documents (FIG. 15). Preferably, only "Summary", "Copy", "Move", "RetrieveToLocalCopy" and "Delete" are available.

By selecting the "Show All Documents" button 212 of FIG. 11, information regarding all of the embedded documents of the packages of FIG. 13 is combined for display in the screen of FIG. 19. If identical documents are embedded in two or more packages, the corresponding document appears only once. Additionally, a "Package Count" value is provided for each job or embedded document. This Package Count, which may also be referred to as "Embedded Document Package Reference Count" indicates how many packages refer to a particular embedded document. The manner in which this feature is implemented will appear from the discussion below.

Referring generally to FIGS. 20 and 21, when an embedded document is selected, a Property Selection Template 214 or 215 is displayed. As shown in the illustrated embodiments of FIGS. 20 and 21, each Template permits a system operator to access a screen referred to as "List Package Membership". Referring to FIG. 22, a screen resulting from the selection of List Package Membership for the job "Printer Manual Vol. One!1" of FIG. 19 is shown. The List Package Membership function causes the names of all packages associated with a selected embedded document, by reference, to be displayed. The manner in which this feature is implemented will appear from the discussion below.

The package/job managing method of the presently disclosed embodiment is implemented, at a location of the printing system of FIG. 10, with an arrangement of three databases, namely a job database ("db") 216 (FIG. 23), package db 218 (FIGS. 24 and 25) and job/package correlation db 220 (FIG. 26), as well as various attendant procedural routines (FIGS. 28–33). As will be appreciated by those skilled in the art, the technique described below could just as easily be implemented at a file/print service as at an electronic printer. Referring to FIG. 23, the job db, having various layers, is shown. A layer 222, includes a job entry count sublayer 224, indicating the number of jobs (embedded documents) in the job db, and a list of job entries sublayer 225 which lists the jobs 226a, 226b, . . . 226n the job db.

Referring still to FIG. 23, job 226b, as with the other jobs in the job db, is characterized by a layer 228, the layer 228 including a group of job level items sublayer 230 and a list of pages sublayer 232 having a list of pages 234a, 234b, . . . 234n for the job 226b. The job level items comprise a list of properties for, among other things, facilitating the printing/finishing of the job 226b. The page 2 of job 226b, as with all of the pages of the job, is characterized by a layer 238, the layer 238 including a group of page level items or properties sublayer 240 for, among other things, facilitating the printing of the pages, as well as sublayers 242 and 244 for storing a set of back images 246a, . . . 246n and a set of front images 248a, 248b, . . . 248n, respectively. Each image, in the sublayers 242, 244 is mapped to a set of items or properties for, among other things, facilitating printing of the images.

Referring to FIGS. 24 and 25, the package db, having various layers, is shown. A layer 250, includes a package entry count sublayer 252, indicating the number of packages in the package db, and a list of package entries sublayer 254 which lists the packages 256a, 256b, . . . 256n of the package db. The package 256b, as with the other packages in the package db, is characterized by a layer 260, the layer 260 including a group of package level items 262, a group of package job override items 264, a group of package first/last page override items 266 and a list of jobs sublayer 268 having a list of jobs 270a, 270b, . . . 270n for a given package. The groups of package level items and package first/last page override items include properties of the type shown in FIG. 12 and discussed in accompanying text. While the package job override items group includes selected properties shown in FIG. 12, and discussed in accompanying text, the group further includes other override features. For example, an override finishing operation can be imposed on each job in a given package. Moreover, among other operations, pages of each job in a package can be reordered and/or reoriented. As will be noted in FIG. 25, a substantial portion of the package db employs concepts of the job db.

The package first/last page override items relate to "set labeling" or "bitmap merging" features, which features are available, currently, on the DocuTech® Printing System. Moreover, a detailed description of set labeling or addressing (which is equivalent conceptually to bitmap merging) is provided in the following references, the pertinent portions of which are incorporated herein by reference:

Now Allowed U.S. patent application Ser. No. 07/628,130 entitled "Set Addressing for Electronic Printing Machines" Filed on Dec. 14, 1990 by Rourke et al.

U.S. patent application Ser. No. 08/(Attorney Docket No. 89285TI) entitled "A Method of Applying Electronically Stored Labels to a Print Job" Filed on Apr. 12, 1994 by Rourke et al.

U.S. patent application Ser. No. 08/(Attorney Docket No. 94093) entitled "Method of Applying Electronically Stored Labels from a Source Job to a Destination Job in a Printing System" Filed on Apr. 12, 1994 by Strossman et al.

The technique of set labeling, as disclosed by these references and described in summary form, includes the steps of:

1) storing multiple destination jobs and one or more source jobs, with labels, in memory, e.g. the job file of the DocuTech® Printing System;
2) mapping the labels, to be applied to the destination jobs, with selected pages of the destination jobs, respectively;
3) using a print outline and an appropriate template (see FIG. 16 of U.S. patent application Ser. No. 08/(Attorney Docket No. 94093)) to designate the position(s) of the labels on the selected pages;
4) forming a command list, with segments, for merging the labels with the selected pages of the destination jobs, wherein each segment corresponds with the merging of a label and a page of a set; and
5) for each segment, printing a predesignated number of sets.

Referring to FIG. 26, the job/package correlation db 220 is discussed in further detail. Essentially, the job/package correlation db uses entries to correlate jobs with packages. The job/package correlation includes a layer 274, the layer 274 including an entry count 276 sublayer, which sublayer maintains a count of the entries in the job/package correlation db, and a list of entries sublayer 278 which includes a list of entries 280a, 280b, . . . 280n. The entry 280b, as with all of the entries, includes a layer 282, the layer 282 including a job identifier 284, a package reference count, which indicates the number of packages in which the job, identified by the job identifier, appears, and a list of package references 285 which includes a list of packages 286a, 286b, . . . 286n. The packages include pointers which respectively link them to a package identifiers.

Referring to FIG. 27, an example of the manner in which the databases 216, 218 and 220 are used in the presently disclosed package/job managing method is shown. Two implementory aspects of the disclosed embodiment, among others, are emphasized by the example of FIG. 27. First, it will be recognized that the package quantity (or count) of FIG. 19 can be obtained by reference to the Job db 216. Second, it will be recognized that the package membership list of FIG. 22 can be obtained by reference to the job/package correlation db 220. For instance, entry #1 provides the system with the fact that job 1 is in packages 1 and 2, entry #2 provides the system with the fact that job 2 is in package 2, and so on. In the discussion of pertinent procedures below, the example of FIG. 27 will be used to clarify steps appropriately.

Additionally, as mentioned above, in the discussion of the override properties of FIG. 12, for one embodiment, each job of a package possesses a preset embedded document quantity (or "copy count") and, for multiple jobs in a package, this property may be overridden collectively. Alternatively, as illustrated in the database 218 of FIG. 27, for another embodiment, the copy quantity of each job would be programmable, on an individual basis. In this other embodiment, an override option would not be required since the copy count of each job, for a given package in the database, could be adjusted by those users with access to the database 218. It should be appreciated that this other embodiment permits copy count to be reprogrammed without affecting a corresponding job in the job file.

Referring to FIGS. 28 and 29, basic operations for creating/copying a package are discussed. Referring specifically to FIG. 28, which relates to creating a package, at step 300 a system user activates a "Create Blank Package" button (FIG. 11) to create a blank package. If a limit for package count has been reached in the system (step 302) then a warning, indicating that package count limit has been reached, is displayed (step 303). Subsequently, at step 304, a display, of the type shown in FIG. 11, is provided. If, on the other hand, the system limit for package count has not been reached, then, at step 306, a package ticket screen, of the type shown in FIG. 12, is brought forth. During step 308, the system user makes a selection on the package ticket screen. Provided the system user is not finished making selections (step 310), modified items are saved via step 312. As soon as the system user is finished making selections, s/he is given a chance to confirm his or her selections (step 314). If no confirmation is made, then the process returns to step 304 where the screen of FIG. 11 is provided; otherwise, the package is prepared, by way of step 316, for insertion into package db 218. After the package is entered into the package db, the list of FIG. 11 is displayed by way of steps 318 and 304.

Referring specifically to FIG. 29, a technique for copying a package is discussed in further detail. At step 322, the operator selects a copy option as shown in FIG. 13 or 16. It is then determined, at step 324, whether the destination of the copy is the printer queue. If the destination is the printer queue, then a check is performed, at step 326, to determine if all of the jobs in the package to be copied are resident at the printing system 2. If all of the jobs are not resident, then a warning message and a list of all packages are displayed sequentially, via steps 328 and 330. The warning message of step 328 is provided since, preferably, the image data for remote jobs is not maintained at the printer. Assuming all of the jobs are resident at the printer or the copy is not destined for the print queue, the process proceeds to step 332 where a check is performed to determine if the system limit for package count has been reached. If the limit has been reached, then a warning is issued at step 334, otherwise appropriate steps are taken, at step 336, to develop basic parameters/information for the package copy. It will be appreciated by those skilled in the art that the copy could be copied for eventual storage at, among other locations, the printer or a remote storage area (See FIG. 10).

To initiate copying of a package, a counter PJC (see package job count of FIG. 27) is developed (step 340) and set to "Job Count", i.e. the embedded document count of the package to be copied. A condition is checked at step 342 and, provided all of the jobs in the package have not been copied, the process proceeds to step 344 where the next indicated job of the package being copied, with its attendant image data and instructions, is read. For this next indicated job, the package reference count of the job db 216 (See e.g. FIG. 27) is incremented. At step 346, the job/package correlation is updated for the copied job. More particularly, referring to the example of FIG. 27, for a given copied job, a reference and job identifier can be appended to an existing entry, if appropriate, or a new entry can be developed for the given copied job. Subsequent to step 346, the value of PJC is decremented (step 348) and the resulting value of PJC is checked at step 342. Once PJC reaches 0, it is again determined, at step 350, whether the copy package is headed for storage or the printer queue. If the copy package is headed toward the print queue, then a designated number of copies of the package copy are produced (step 352), otherwise a new list of packages is retrieved from the package database 218 (step 354) for display, by way of step 330.

Figure 30:
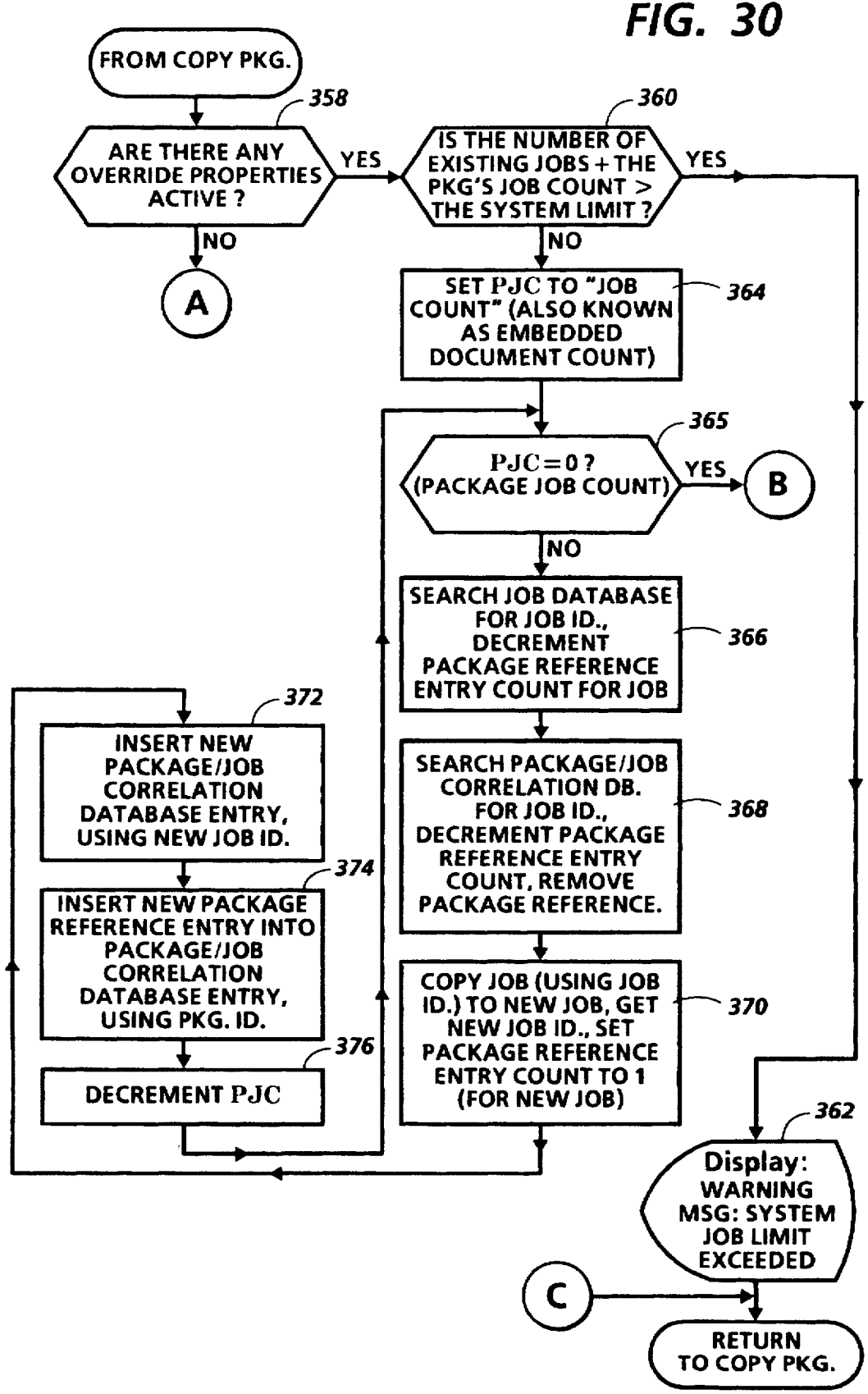

FIGS. 30–33 relate to a technique of formatting a package for printing. Referring specifically to the illustrated embodiment of FIG. 30, a copy package is examined, at step 358, to determine if any override properties exist. If no override properties are present, the process proceeds to FIG. 31 for print formatting, otherwise the steps of FIG. 30 are employed to prepare the package for programming with the override properties. Referring still to FIG. 30, at step 360, a check is performed to determine if the capacity of the system has been exceeded. If the capacity of the system has been exceeded, a warning message is, via step 362, displayed, otherwise PJC is set to the value of "Job Count" at step 364.

For the first job of the copy package, the package reference count of the job db 216 (See e.g. FIG. 27) is decremented (step 366). The job/package correlation db 220 is then searched, at step 368, for decrementing the package reference entry count, associated with the first job, and removing the package reference for the first job. At step 370, the first job is copied to a new job and assigned a new job identifier. Additionally, the package reference count for the new first job is set to one. To accommodate for the new first job, in job/package correlation db 220, a new entry, with a corresponding new package reference, are inserted into the db 220 by way of steps 372, 374. PJC is then decremented, at step 376, and the process returns to step 365 where the routine of steps 366, 368, 370, 372 and 374 is repeated until each job in the copy package is processed.

Figure 32:
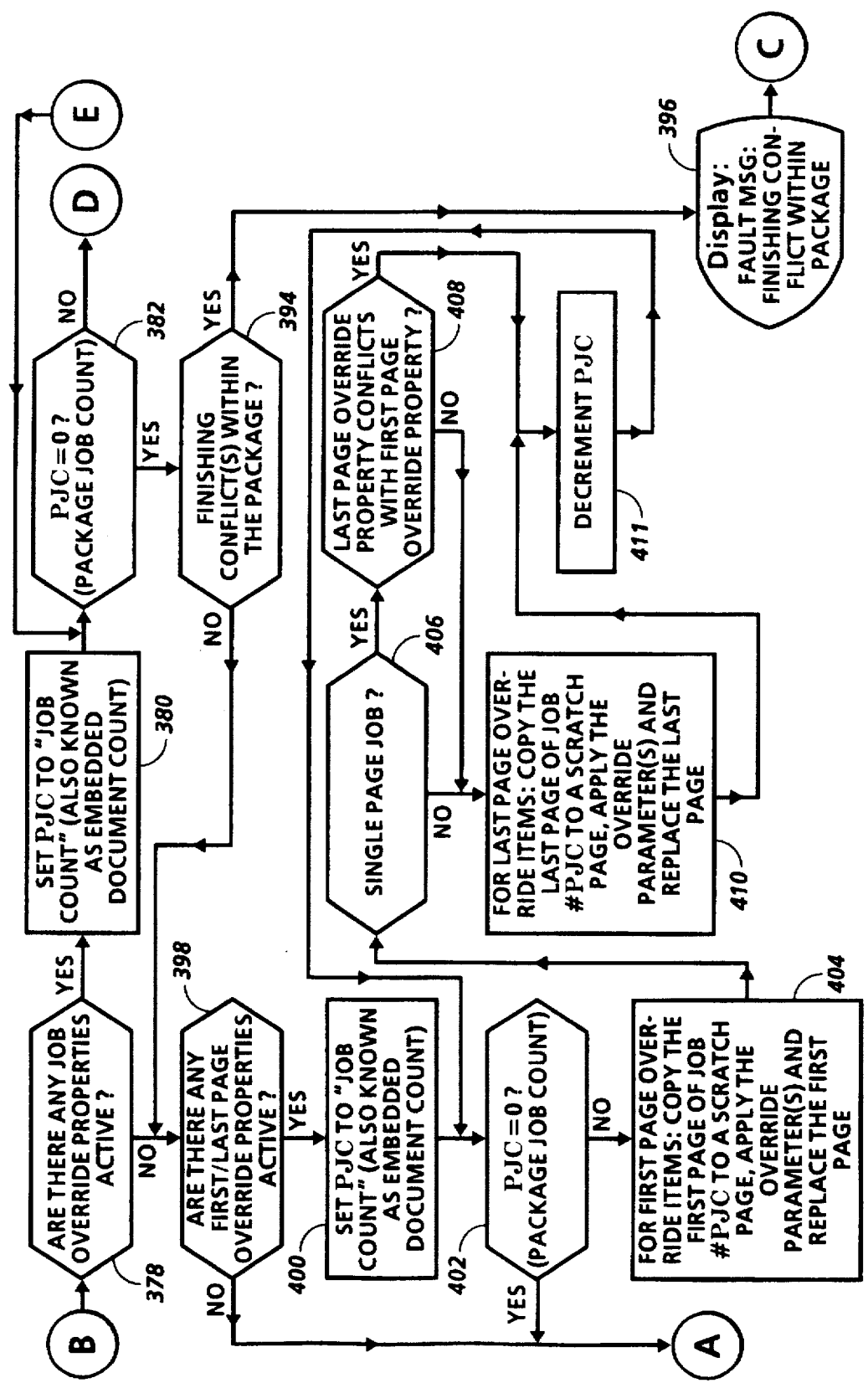
Figure 33:
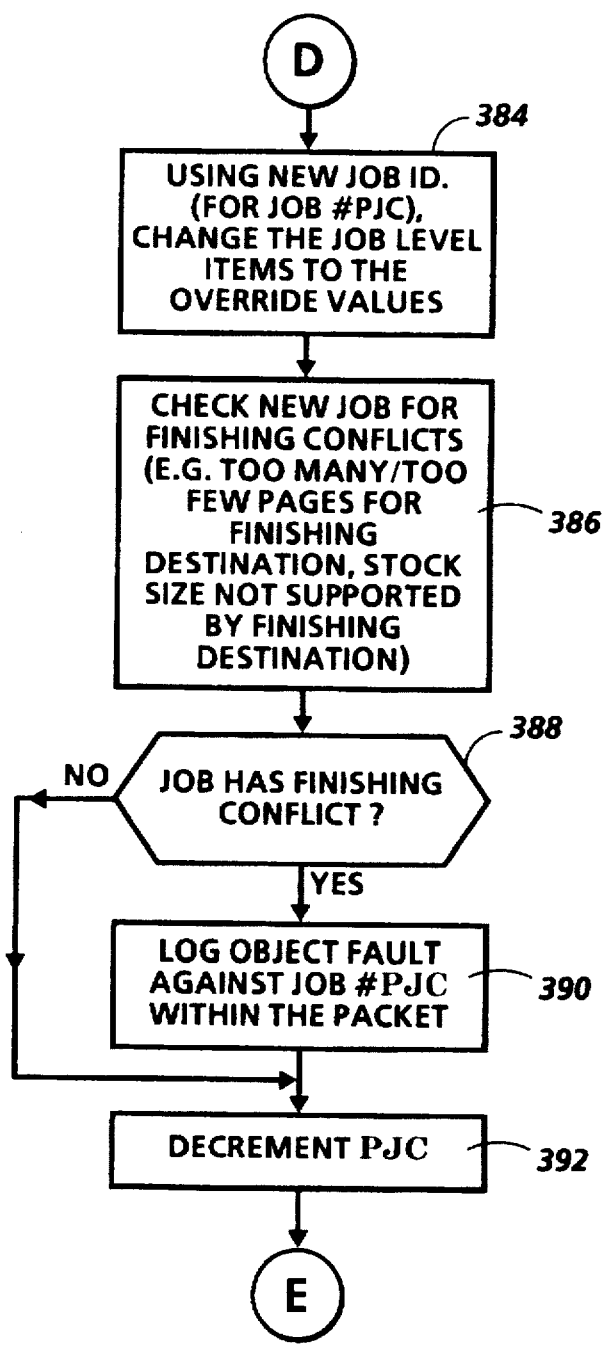

Once a package has been prepared to be programmed with override properties, the process proceeds to the routine of FIG. 32 where the package is programmed with job override properties and then first/last page override properties. At step 378 (FIG. 32), it is decided whether any job override properties are active. Assuming at least one job override property is active, PJC is set to "Job Count" (step 380), i.e. the number of embedded documents in the prepared package, and a check of PJC is performed at step 382. With the first job requiring job (FIG. 33) override properties, a change of associated job level items to specified override values is performed at step 384. Steps 386 and 388 are used to check for finishing conflicts in the first job, and, if a finishing conflict exists, an object fault is logged, at step 390, against the first job. Subsequently, the value of PJC is decremented (step 392) and steps 382, 384, 386, 388, 390 (if necessary) and 392 are performed for each remaining job having job override properties is processed.

After each job with job override properties has been processed, the package is examined, at step 394 (FIG. 32), for finishing conflicts. If there are any package finishing conflicts, a fault message is displayed, via step 396, otherwise the process proceeds to step 398 for determining if any first/last page override properties are active. If no first/last page override properties are active, then the process proceeds to the routine of FIG. 31, otherwise PJC is set to "Job Count", at step 400 (FIG. 32), and a condition is checked at step 402. At step 404, first page override items are developed, if appropriate, by copying the current label/bitmap of the first page to a scratch page and replacing the first page. If the job is a single page job (step 406), then a check is performed, at step 408, for a last page override property conflict, of the type described above in the discussion of FIG. 12. Assuming no last page override property conflict exists, at step 410, last page override items are developed, if appropriate, by use of the same principles as applied for the first page override items. The value of PJC is decremented, at step 411, and further first/last page override operations are performed for remaining Jobs, if necessary.

Figure 31:
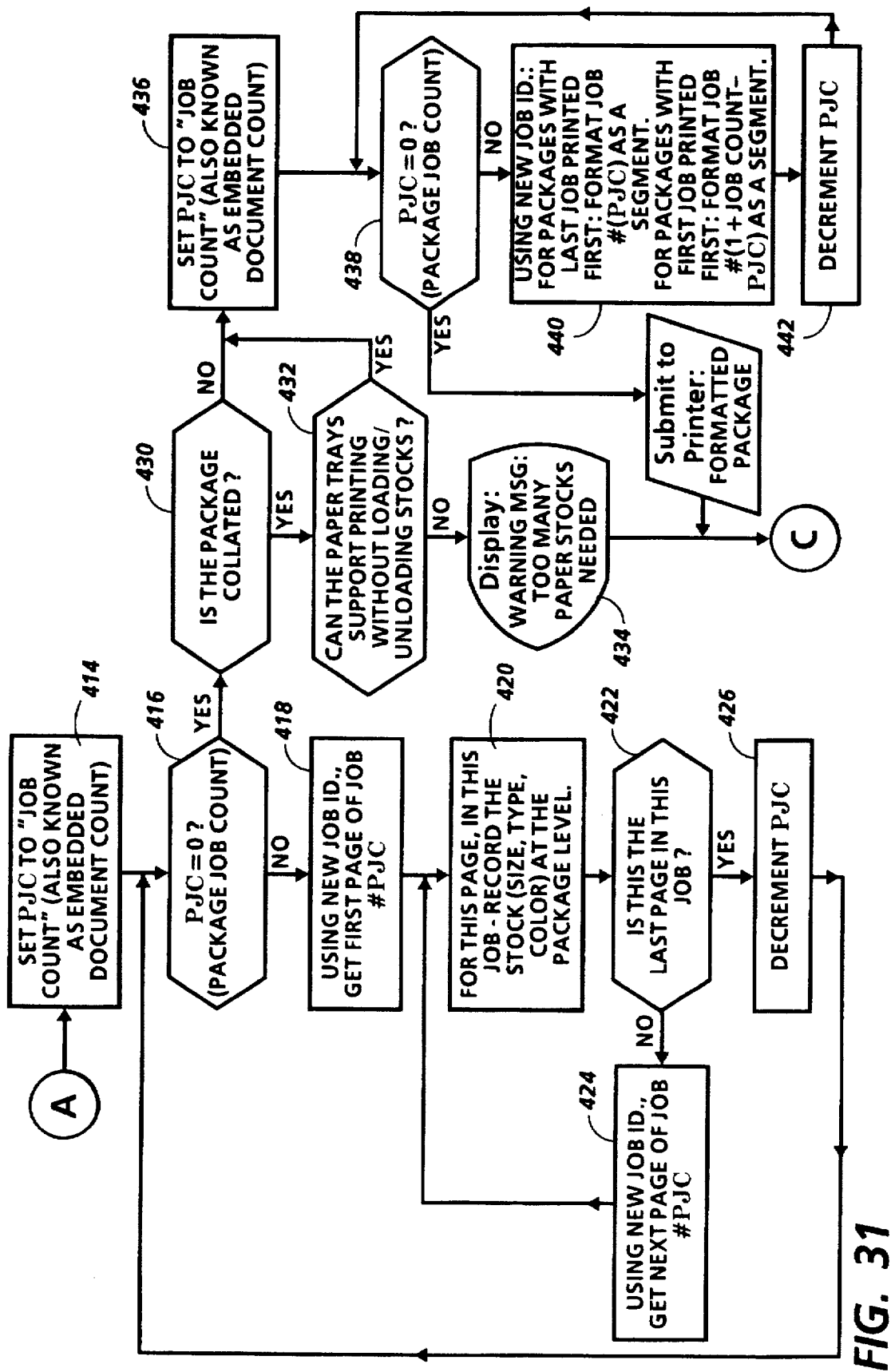

Referring to FIG. 31, the print formatting procedure is discussed in further detail. At step 414, PJC is set to "Job Count" and, at step 416, the value of PJC is checked. With the identifier of the first job of the package, a corresponding first page is retrieved (step 418). For this page (step 420), the corresponding stock is recorded at a package level, Similarly, the stock type of the remaining pages of the first job is recorded by way of steps 420, 422 and 424. After the processing of each job, PJC is decremented (step 426), and upon processing all of the jobs of the package have been processed, it is determined, at step 430, whether the package is collated. If the job is collated, then a check is performed, at step 432, to determine if the paper trays of the printer can support all of the required stock types. As will be appreciated, all of the stock types required to print the package were obtained through the procedure described immediately above. If there are too many stock types, a warning is displayed at step 434.

Referring still to FIG. 31, for collated or uncollated formatted Jobs, at step 436, PJC is set to "Job Count" for the first job and the condition, at step 438, is checked. Step 440 is used in conjunction with steps 438 and 442, to format the jobs of a package so that they print either 1–N or N–1. Once all of the jobs have been processed, for printing order, the formatted package is returned to memory for eventual printing. As should be appreciated by reference to FIG. 31, certain packages, particularly those with a wide variety of stock are preferably formatted as uncollated. In this way, frequent changing of paper trays is not required. As should be further appreciated, there are other circumstances in which uncollated formatting is preferred. For example, a package, with a plurality of jobs calling for many different types of finishing operations, can require frequent, undesirable servicing of attendant finishing devices during operation. Accordingly for ease of operation, a package requiring many different types of finishing operations may best be formatted as uncollated.

Numerous features of the above-disclosed embodiment will be appreciated by those skilled in the art:

One feature of the disclosed embodiment is that jobs, each of which may include one or more finishing instructions, are linked to a package by way of references or pointers. In turn, a collated package, having at least one finished job is produced. Preferably, each job of the package can be programmed in such a manner that it possesses its own unique finishing properties. Conversely, the finishing properties of the jobs of a package can be coordinated to make the package, as a whole, consistent. For instance, it may be desirable to bind a job that was intended to be stitched when many of the other jobs in the package are to be bound.

Another feature of the disclosed embodiment is that multiple packages with common jobs may be developed. A technique for handling the packages, which avoids corruption of any one package, is provided. In one example, a first package and a second package have respective pointers to a common job. When editing the common job of the second package, an electronic copy of the common job is edited and a pointer, linking the edited common job to the second page is provided. The pointer linking the second package to the common job is then deleted.

Yet another feature of the disclosed embodiment, is that a list, indicating the package membership of a given job, can be displayed. With this membership information, changes in the packages, as a result of editing the given job, are trackable. Accordingly, it is easy to keep users of a wide variety of packages apprised as to changes in their package (s) resulting from one or more changes in the given job. Upon making changes to the given job, which changes are common to multiple packages, the list can be employed to inform the corresponding package owners of such changes.

Yet another feature of the disclosed embodiment is that optimal control is obtained over the packages through use of override capabilities. In one example, the jobs of a package call for the printing of different quantities of print sets. With a quantity override feature, each job can be made to print the same quantity of print sets. In another example, various jobs of a package might include a variety of finishing options. With a finishing override feature, finishing operations can be made consistent across all of the jobs of the package. In yet another example, the various jobs of a package may be printed with a variety of stock types. With a stock type override feature, a single stock type can be used to print each of the jobs. In yet another example, various, different bitmaps are respectively positioned on the first and/or last pages of a plurality of jobs in a package. With a bitmap override feature the same bitmap can be applied to each designated first and/or last pages of the package jobs.

Yet another feature of the disclosed embodiment is a package that includes jobs stored remotely of the printing machine. This remote storage capability is particularly advantageous in that not all jobs of the package need be stored at the printing machine and, at the same time, the printing machine is provided with a wide range of job sources. Accordingly, packages can be developed with jobs from remote locations or at remote locations. With the present technique, a user, at the printing machine, or any other location at which a package resides is preferably informed, graphically, of a local/remote distinction, among jobs, by way of characteristic icons.

Packages can also be compiled with remote job copies while maintaining the integrity of the remotely stored jobs. More particularly, remote jobs are copied to the residence of the corresponding package so that, if such copies are deleted, an original still exists at a remote location. Moreover, a package with one or more remote jobs can be placed readily in print ready format by simply retrieving one or more remote copies to the printing machine. In turn, mass memory space, e.g. disk space, in which the copies are preferably stored, can be made available by deleting the copies. At a later time, print readiness can be achieved for the same package by repeating the retrieving process.

Another feature of the disclosed embodiment is that a package can be stored out to a remote location for use by others besides those with access to the printing machine. This permits a user, disposed remotely of the printing machine, to access the package. In one example, a user disposed remotely of the original residence of the package obtains a stored version of the package and outputs that package locally. In another example, a list of packages stored at a printing machine or server is made available to the remote user. By reference to the list, the remote user can access a stored package for use at his or her area.

What is claimed is:

1. In a printing system with memory and a user interface having a display, a method for managing a plurality of print jobs, associated with a package, wherein each print job includes a set of instructions so that, upon printing the package, each print job is printed in accordance with a preprogrammed set of characteristic printing properties, and at least one of the print jobs is finished in accordance with a finishing instruction, comprising:

creating, in the memory, a first package, the first package including a first reference and a second reference, a first print job being operatively linked with the first package by way of the first reference and a second print job being operatively linked with the first package by way of the second reference;

creating, in memory, a second package;

programming a third print job with a third set of instructions;

providing the second package with a third reference so that the third print job is operatively linked to the second package; and providing the second package with the first reference so that the first print job is operatively linked to both the first package and the second package, and so that a change to the first print job of the second package automatically causes a corresponding change to the first print job of the first package displaying a list, on the display, of each package having a reference which operatively links the first print job thereto;

programming the first print job with a first set of instructions and the second print job with a second set of instructions, the first set of instructions including the finishing instruction; and producing a collated print set of the first package, the collated first package print set including a finished print set of the first print job, produced in accordance with the first set of instructions and a print set of the second print job, produced in accordance with the second set of instructions.

2. The method of claim 1, further comprising:
providing the first package with a set of instructions;
programming a third print job with the set of first package instructions;
producing a print set of the third print job in accordance with the first package instructions.

3. The method of claim 1, further comprising:
generating an electronic copy of the first print job of the second package;
editing the electronic copy so that the first print job of the first package is not corrupted by changes made to the first print job of the second package;
providing the second package with a reference that operatively links the electronic copy with the second package; and
deleting the first reference of the second package.

4. The method of claim 1, wherein said programming includes programming the second print job with an instruction corresponding to a finishing operation so that the print set of the second print job is a finished print set.

5. The method of claim 1, in which the second set of instructions includes a finishing instruction, further comprising:
providing the first package with a finishing instruction;
substituting the package finishing instruction for both the finishing instruction of the first print job and the finishing instruction of the second print job; and
producing a print set of the first package, the first package print set including a print set of the first print job finished in accordance with the first package finishing instruction and a print set of the second print job finished in accordance with the first package finishing instruction.

6. The method of claim 1, in which the first set of instructions requires printing of a first quantity of print sets and the second set of instructions requires printing of a second quantity of print sets, with the first quantity being different from the second quantity, further comprising programming the first package, at a package level, so that said producing results in a third quantity of print sets being produced for each of the first print job and the second print job.

7. The method of claim 1, in which the first set of instructions requires the production of one or more prints with a first stock type and the second set of instructions requires production of one or more prints with a second stock type, with the first stock type being different from the second stock type, further comprising programming the first package, at a package level, so that said producing results in all of the prints requiring production with the first stock type and the second stock type being produced with a third stock type.

8. The method of claim 7, further comprising providing the first stock type and the second stock type in the form of cover stock.

9. In a printing system with memory, a method for managing a plurality of print jobs, associated with a package, wherein each print job includes a set of instructions so that, upon printing the package, each print job is printed in accordance with a preprogrammed set of characteristic printing properties, and at least one of the print jobs is finished in accordance with a finishing instruction, comprising:

creating, in the memory, a first package, the first package including a first reference and a second reference, a first print job being operatively linked with the first package by way of the first reference and a second print job being operatively linked with the first package by way of the second reference;

programming the first print job with a first set of instructions and the second print job with a second set of instructions, the first set of instructions including the finishing instruction;

producing a collated print set of the first package, the collated first package print set including a finished print set of the first print job, produced in accordance with the first set of instructions and a print set of the second print job, produced in accordance with the second set of instructions; and wherein a plurality of collated representations of the first package are produced and said method further comprises, creating, in memory, a second package, programming a third print job with a third set of instructions, providing the second package with a third reference so that the third print job is operatively linked to the second package, providing the second package with the first reference so that the first print job is operatively linked to both the first package and the second package, and so that a change to the first print job of the second package automatically causes a corresponding change to the first print job of the first package, and transmitting the plurality of collated representations of the first package to a first group of package users, respectively.

10. The method of claim 9, in which a plurality of collated representations of the second package are produced and transmitted to a second group of users, respectively, further comprising:
editing a selected one of the first print job of the first package and the first print job of the second package; and in response to said editing, transmitting a copy of the edited first print job to each user of the first group of users or a copy of the edited second print job to each user of the second group of users.

11. In a printing system with memory, a method for managing a plurality of print jobs, associated with a package, wherein each print job includes a set of instructions so that, upon printing the package, each print job is printed in accordance with a preprogrammed set of characteristic printing properties, and at least one of the print jobs is finished in accordance with a finishing instruction, comprising:

- creating, in the memory, a first package, the first package including a first reference and a second reference, a first print job being operatively linked with the first package by way of the first reference and a second print job being operatively linked with the first package by way of the second reference;
- programming the first print job with a first set of instructions and the second print job with a second set of instructions, the first set of instructions including the finishing instruction;
- producing a collated print set of the first package, the collated first package print set including a finished print set of the first print job, produced in accordance with the first set of instructions and a print set of the second print job, produced in accordance with the second set of instructions; and
- wherein a first bitmap is mapped to a page of the first print job and a second bitmap is mapped to a page of the second print job, with the first bitmap being different than the second bitmap, and said method further comprises programming the package, at a program level, so that a third bitmap is mapped to the page of the first print job, in place of the first bitmap, and the third bitmap is mapped to the page of the second print job, in place of the second bitmap.

12. A method for managing a plurality of jobs, stored in a first package, with a printing system having a printing machine communicating with both a first memory section and a second memory section, the second memory section being disposed remotely of the printing machine, each job in the package being outputted in accordance with a preprogrammed set of characteristic printing properties, comprising:

- creating, in the first memory section, a first package, the first package including a first reference and a second reference, the first job being operatively linked with the first package by way of the first reference and the second job being operatively linked with the first package by way of the second reference;
- programming the first job with a first set of instructions and a second job with a second set of instructions;
- storing the first job in the second memory section;
- transmitting a copy of the first job, with a copy of the first set of instructions, from the second memory section to the printing machine;
- communicatively coupling the first memory section with the printing machine so that the first memory section is disposed in the printing machine; and
- in response to said transmitting, producing a package representation of the first package, the package representation including a representation of the first job copy, produced in accordance with the first set of instructions, and a representation of the second job, produced in accordance with the second set of instructions.

13. The method of claim 12, further comprising generating one or both of the first job and the second job at a location disposed remotely of the printing machine, the remote location being in communication with the second memory section.

14. The method of claim 12, wherein said producing includes producing a package print set with a print set of the first job and a print set of the second job.

15. The method of claim 14, wherein said producing includes collating the package print set.

16. The method of claim 14, in which a selected one of the first set of instructions and the second set of instructions includes a finishing instruction corresponding with a finishing operation, wherein said producing further includes finishing a selected one of the first job and the second job by reference to the finishing instruction.

17. The method of claim 14, in which each of the first set of instructions and the second set of instructions includes a finishing instruction corresponding with a finishing operation, wherein said producing further includes finishing the first job, in accordance with the finishing instruction of the first set of instructions, and the second job, in accordance with the finishing instruction of the second set of instructions.

18. The method of claim 17, further comprising substituting an override finishing instruction for both of the finishing instruction of the first set of instructions and the finishing instruction of the second second of instructions so the each of the first job and the second job is finished in accordance with the override finishing instruction.

19. The method of claim 12, further comprising:
- editing the copy of the first job, the representation of the first package including any changes made by said editing;
- deleting the first job copy, subsequent to said producing, the first reference still operatively coupling the first job of the second memory section to the first package even after said deleting.

20. The method of claim 12, in which the first set of instructions requires printing of a first quantity of print sets and the second set of instructions requires printing of a second quantity of print sets, with the first quantity being different from the second quantity, further comprising programming the first package, at a package level, so that said producing results in a third quantity of print sets being produced for each of the first job and the second job.

21. The method of claim 12, in which the first set of instructions requires the production of one or more prints with a first stock type and the second set of instructions requires production of one or more prints with a second stock type, with the first stock type being different from the second stock type, further comprising programming the first package, at a package level, so that said producing results in all of the prints requiring production with the first stock type and the second stock type being produced with a third stock type.

22. A method for managing a plurality of jobs, stored in a first package, with a printing system having a printing machine communicating with both a first memory section and a second memory section, the second memory section being disposed remotely of the printing machine, each job in the package being outputted in accordance with a preprogrammed set of characteristic printing properties, comprising:

- creating, in the first memory section, a first package, the first package including a first reference and a second reference, the first job being operatively linked with the first package by way of the first reference and the second job being operatively linked with the first package by way of the second reference;
- programming the first job with a first set of instructions and a second job with a second set of instructions;

storing the first job in the second memory section;

transmitting a copy of the first job, with a copy of the first set of instructions, from the second memory section to the printing machine;

in response to said transmitting, producing a package representation of the first package, the package representation including a representation of the first job copy, produced in accordance with the first set of instructions, and a representation of the second job, produced in accordance with the second set of instructions wherein the first memory is disposed in the printing machine and the first job copy is transmitted thereto, and said method further comprises the step of deleting the first job copy, after said producing step, to make space available in the first memory.

23. A method for managing a plurality of jobs, stored in a first package, with a printing system having a printing machine communicating with both a first memory section and a second memory section, the second memory section being disposed remotely of the printing machine, each job in the package being outputted in accordance with a preprogrammed set of characteristic printing properties, comprising:

creating, in the first memory section, a first package, the first package including a first reference and a second reference, the first job being operatively linked with the first package by way of the first reference and the second job being operatively linked with the first package by way of the second reference;

programming the first job with a first set of instructions and a second job with a second set of instructions;

storing the first job in the second memory section;

transmitting a copy of the first job, with a copy of the first set of instructions, from the second memory section to the printing machine;

in response to said transmitting, producing a package representation of the first package, the package representation including a representation of the first job copy, produced in accordance with the first set of instructions, and a representation of the second job, produced in accordance with the second set of instructions wherein a third job and a fourth job are stored in the first memory section and the printing machine includes a user interface, with a display, for displaying information regarding a plurality of packages stored in the first memory section, and said method further comprises (1) creating, in the first memory, a second package, the second package including a third reference and a fourth reference, the third job being operatively linked with the second package by way of the third reference and the fourth job being operatively linked with the second package by way of the fourth reference, and (2) displaying, with the display, a first icon indicating that a portion of the first package is stored remotely of the printing machine, and a second icon indicating that all portions of the second package are stored in the first memory section.

24. The method of claim 23 in which each job comprises image data and instructions, and the third job includes image data and instructions that are equivalent to the image data and instructions of the second job, further comprising displaying a list indicating that the second job or the third job are linked operatively with both the first package and the second package.

25. A method for managing a plurality of jobs, stored in a first package, with a printing system having a printing machine communicating with both a first memory section and a second memory section, the second memory section being disposed remotely of the printing machine, each job in the package being outputted in accordance with a preprogrammed set of characteristic printing properties, comprising:

creating, in the first memory section, a first package, the first package including a first reference and a second reference, the first job being operatively linked with the first package by way of the first reference and the second job being operatively linked with the first package by way of the second reference;

programming the first job with a first set of instructions and a second job with a second set of instructions;

storing the first job in the second memory section;

transmitting a copy of the first job, with a copy of the first set of instructions, from the second memory section to the printing machine;

in response to said transmitting, producing a package representation of the first package, the package representation including a representation of the first job copy, produced in accordance with the first set of instructions, and a representation of the second job, produced in accordance with the second set of instructions wherein a first bitmap is mapped to a page of the first job and a second bitmap is mapped to a page of the second job, with the first bitmap being different than the second bitmap, and said method further comprises programming the package, at a program level so that a third bitmap is mapped to the page of the first job, in place of the first bitmap, and the third bitmap is mapped to the page of the second job, in place of the second bitmap.

26. A printing system, with a memory, for processing and printing a package of print jobs, wherein each print job includes a set of instructions so that, upon printing the package, each print job is printed in accordance with a preprogrammed set of characteristic printing properties, and at least one of the print jobs is finished in accordance with a finishing instruction, comprising:

a processor for creating a first package, the first package residing in the memory and including a first reference and a second reference, a first print job being operatively linked with the first package by way of the first reference and a second print job being operatively linked with the first package by way of the second reference;

a user interface, communicating with said processor, for programming the first print job with a first set of instructions and the second print job with a second set of instructions, the first set of instructions including the finishing instruction;

wherein, (1) a third print job with a third set of instructions is programmed with said user interface, (2) a second package with a third reference is provided so that the third print job is operatively linked to the second package, and (3) the second package is provided with the first reference so that the first print job is operatively linked to both the first package and the second package, and so that a change to the first print job of the second package automatically causes a corresponding change to the first print job of the first package;

wherein said user interface includes a display and a list of each package having a reference which operatively links the first print job thereto is displayed on said display; and a printing machine, communicating with the memory, for producing a collated print set of the first package, the collated first package print set including a finished print set of the first print job, produced in accordance with the first set of instructions and a print set of the second print job, produced in accordance with the second set of instructions.

27. The printing system of claim 26, further comprising:

a second package is created in memory;

a third print job is programmed with a third set of instructions;

the second package is provided with a third reference so that the third print job is operatively linked to the second package; and the second package is provided with the first reference so that the first print job is operatively linked to both the first package and the second package, and so that a change to the first print job of the second package automatically causes a corresponding change to the first print job of the first package.

28. The printing system of claim 27, wherein:

an electronic copy of the first print job of the second package is generated;

the electronic copy is edited so that the first print job of the first package is not corrupted by changes made to the first print job of the second package;

the second package is provided with a reference that operatively links the electronic copy with the second package; and the first reference of the second package is deleted.

29. A printing system with a first memory section and a second memory section, the second memory section being disposed remotely of the printing machine, each job in the package being outputted in accordance with a programmed set of characteristic printing properties, comprising:

a processor for creating, in the first memory section, a first package, the first package including a first reference and a second reference, the first job being stored in the second memory section and operatively linked with the first package by way of the first reference, and the second job being operatively linked with the first package by way of the second reference;

a user interface, with a display, for programming the first job with a first set of instructions and a second job with a second set of instructions;

a connection, operatively coupling said first memory section and said second memory section, for transmitting a copy of the first job, with a copy of the first set of instructions, from the second memory section to the first memory;

a printing machine, communicating with first memory section, for producing a package representation of the first package, the package representation including a representation of the first job copy, produced in accordance with the first set of instructions, and a representation of the second job, produced in accordance with the second set of instructions wherein, (1) a third job and a fourth job are stored in the first memory section (2) a second package, including a third reference and a fourth reference, is created in the first memory section, (3) the third job is operatively linked with the second package by way of the third reference and the fourth job is operatively linked with the second package by way of the fourth reference, (4) a first icon and a second icon are both displayed on said display with the first icon indicating that a portion of the first package is stored remotely of the printing machine and the second icon indicating that all portions of the second package are stored in the first memory section.

30. The printing system of claim 29, wherein one or both of the first job and the second job are generated at a location disposed remotely of the printing machine, the remote location being in communication with the second memory section.

* * * * *